(12) United States Patent
Dang et al.

(10) Patent No.: US 12,448,414 B2
(45) Date of Patent: Oct. 21, 2025

(54) ANTIMICROBIAL PEPTIDE (AMP) FOR CONTROLLING *Pseudomonas syringae* PV. *actinidiae* (PSA) AND PREPARATION METHOD AND USE THEREOF

(71) Applicant: Anhui Agricultural University, Hefei (CN)

(72) Inventors: Xiangli Dang, Hefei (CN); Lifang Wang, Hefei (CN); Mingyu Zhang, Hefei (CN)

(73) Assignee: ANHUI AGRICULTURAL UNIVERSITY, Hefei (CN)

( * ) Notice: Subject to any disclaimer, the term of this patent is extended or adjusted under 35 U.S.C. 154(b) by 219 days.

(21) Appl. No.: 18/298,209

(22) Filed: Apr. 10, 2023

(65) Prior Publication Data
US 2024/0262862 A1 Aug. 8, 2024

(30) Foreign Application Priority Data

Feb. 7, 2023 (CN) .......................... 202310123493.7

(51) Int. Cl.
*C07K 7/06* (2006.01)
*A61P 31/04* (2006.01)

(52) U.S. Cl.
CPC ................ *C07K 7/06* (2013.01); *A61P 31/04* (2018.01)

(58) Field of Classification Search
CPC ....................................................... C07K 7/06
See application file for complete search history.

(56) References Cited

FOREIGN PATENT DOCUMENTS

WO WO-2018068135 A1 * 4/2018 ........... C12N 15/102

OTHER PUBLICATIONS

Shalev DE, Mor A, Kustanovich I. Structural consequences of carboxyamidation of dermaseptin S3. Biochemistry. Jun. 11, 2002;41(23):7312-7. doi: 10.1021/bi016013m. PMID: 12044162. (Year: 2002).*
Yampolsky LY, Stoltzfus A. The exchangeability of amino acids in proteins. Genetics. Aug. 2005;170(4):1459-72. doi: 10.1534/genetics. 104.039107. Epub Jun. 8, 2005. PMID: 15944362; PMCID: PMC1449787. (Year: 2005).*
Marino G, Eckhard U, Overall CM. Protein Termini and Their Modifications Revealed by Positional Proteomics. ACS Chem Biol. Aug. 21, 2015;10(8):1754-64. doi: 10.1021/acschembio.5b00189. Epub Jul. 6, 2015. PMID: 26042555. (Year: 2015).*
Israelachvili, Jacob N. (2011). Intermolecular and Surface Forces (3rd Edition)—20.9 Other Amphiphilic Structures and the Transitions between Them. (pp. 558). Elsevier. (Year: 2011).*
Burgess et al., J of Cell Bio. 111:2129-2138, 1990 (Year: 1990).*
Nonaka et al. Human Molecular Genetics, vol. 18, No. 18, p. 3353-3364, 2009 (Year: 2009).*
Ju et al. Proceedings of the National Academy of Sciences, U.S.A., vol. 88, p. 2658-2662, 1991 (Year: 1991).*
Baker et al. Immunity, vol. 13, p. 475-484, 2000 (Year: 2000).*
Martindale et al. Nature Genetics, vol. 18, p. 150-154, 1998 (Year: 1998).*
Wang, Xiaoling, et al. "Potential aggregation prone regions in biotherapeutics: a survey of commercial monoclonal antibodies." MAbs. vol. 1. No. 3. Taylor & Francis, 2009. (Year: 2009).*
Sawai, Monali V., et al. "Impact of single-residue mutations on the structure and function of ovispirin/novispirin antimicrobial peptides." Protein engineering 15.3 (2002): 225-232. (Year: 2002).*
Bolognesi, Benedetta, et al. "Single point mutations induce a switch in the molecular mechanism of the aggregation of the Alzheimer's disease associated Aβ42 peptide." ACS Chemical Biology 9.2 (2014): 378-382. (Year: 2014).*
Bai; Jun et al. "Application of phage therapy against red-fleshed kiwifruit canker", Biological Control 169 (2022) 104893, p. 1-10.
Barrett-Manako et al., 2021, Real-Time PCR and Droplet Digital PCR Are Accurate and Reliable Methods to Quantify Pseudomonas syringae pv. actinidiae Biovar 3 in Kiwifruit Infected Plantlets, The American Phytopathological Society (105)1748-1757.
Chang et al., 2021, Antimicrobial Activity of the Peptide LfcinB15 against Candida albicans, J. Fungi (7) pp. 1-18.
Dang et al., 2019, Antimicrobial peptides from the edible insect *Musca domestica* and their preservation effect on chilled pork, Journal of Food Processing and Preservation, 11 pages.

(Continued)

*Primary Examiner* — Jeanette M Lieb
*Assistant Examiner* — David Paul Bowles
(74) *Attorney, Agent, or Firm* — Goodhue, Coleman & Owens, P.C.

(57) ABSTRACT

The present disclosure provides an antimicrobial peptide (AMP) for controlling *Pseudomonas syringae* pv. *actinidiae* (PSA) and a preparation method and use thereof, belonging to the technical field of biological control. In the present disclosure, the AMP has an amino acid sequence of Trp-Trp-Lys-Leu-Leu-Arg-Lys-Leu-NH$_2$, and has a typical amphiphilic structure. The AMP can target a cell membrane of the PSA, increasing permeabilization and dissipating a membrane potential, which leads to calcium ion leakage. The AMP also acts on intracellular targets, affects DNA functions, reduces an activity of esterases, and induces the generation of reactive oxygen species (ROS). The AMP has a minimal inhibitory concentration (MIC) of 3.13 μg/mL and a half maximal effective concentration (EC$_{50}$) of 1.67 μg/mL for the PSA, showing an activity significantly higher than that of agricultural streptomycin.

11 Claims, 20 Drawing Sheets

Specification includes a Sequence Listing.

(56) References Cited

OTHER PUBLICATIONS

Gupta et al., 2015, Short, Synthetic Cationic Peptides Have Antibacterial Activity against *Mycobacterium smegmatis* by Forming Pores in Membrane and Synergizing with Antibiotics, Antibiotics (4) 358-378.
Juba et al., Helical cationic antimicrobial peptide length and its impact on membrane disruption, Biochimica et Biophysica Acta 1848 (2015) 1081-1091.
Mishra et al., 2017, Individual and Combined Effects of Engineered Peptides and Antibiotics on Pseudomonas aeruginosa Biofilms. Pharmaceuticals (10), 15 pages.
Nguyen et al., 2021, Comparison of Two Transmission Electron Microscopy Methods to Visualize Drug-Induced Alterations of Gram-Negative Bacterial, Morphology. Antibiotics (10), 15 pages.
Steczko et al. Microbial inactivation properties of a new antimicrobial/ antithrombotic catheter lock solution (citrate/methylene blue/ parabens). Nephrol Dial Transplant (2009) 24: 1937-1945.

\* cited by examiner a b a b c  Control efficiency of antimicrobials against *Psa* in kiwifruit leaves at 1 MIC

| Treatment | Lesion area/Leaf area (%) | | | Control efficiency (%) |
|---|---|---|---|---|
| | 0 h | 48 h | 96 h | |
| Control | 0.00 ± 0.00 | 33.38 ± 9.29a | 53.46 ± 7.37a | / |
| AS | 0.00 ± 0.00 | 17.52 ± 2.09ab | 23.47 ± 2.10b | 55.80 ± 2.15b |
| AMP | 0.00 ± 0.00 | 12.97 ± 0.45b | 15.27 ± 1.38b | 70.53 ± 6.65a |

FIG. 8C

SEQUENCE LISTING

```
Sequence total quantity: 19
SEQ ID NO: 1            moltype = AA   length = 8
FEATURE                 Location/Qualifiers
source                  1..8
                        mol_type = protein
                        organism = synthetic construct
SEQUENCE: 1
WWKLLRKL                                                          8

SEQ ID NO: 2            moltype = DNA  length = 17
FEATURE                 Location/Qualifiers
source                  1..17
                        mol_type = other DNA
                        organism = synthetic construct
SEQUENCE: 2
tgcccactcg cacttca                                                17

SEQ ID NO: 3            moltype = DNA  length = 17
FEATURE                 Location/Qualifiers
source                  1..17
                        mol_type = other DNA
                        organism = synthetic construct
SEQUENCE: 3
tcccgaccac caaacac                                                17
```

-continued

```
SEQ ID NO: 4            moltype = DNA  length = 16
FEATURE                 Location/Qualifiers
source                  1..16
                        mol_type = other DNA
                        organism = synthetic construct
SEQUENCE: 4
tgctgtcacg cctcaa                                                    16

SEQ ID NO: 5            moltype = DNA  length = 16
FEATURE                 Location/Qualifiers
source                  1..16
                        mol_type = other DNA
                        organism = synthetic construct
SEQUENCE: 5
gccgcagaat gaaatg                                                    16

SEQ ID NO: 6            moltype = DNA  length = 17
FEATURE                 Location/Qualifiers
source                  1..17
                        mol_type = other DNA
                        organism = synthetic construct
SEQUENCE: 6
tcaagaacgc caactgc                                                   17

SEQ ID NO: 7            moltype = DNA  length = 17
FEATURE                 Location/Qualifiers
source                  1..17
                        mol_type = other DNA
                        organism = synthetic construct
SEQUENCE: 7
tcgctaccga caacctc                                                   17

SEQ ID NO: 8            moltype = DNA  length = 17
FEATURE                 Location/Qualifiers
source                  1..17
                        mol_type = other DNA
                        organism = synthetic construct
SEQUENCE: 8
ccgccattat caggaga                                                   17

SEQ ID NO: 9            moltype = DNA  length = 17
FEATURE                 Location/Qualifiers
source                  1..17
                        mol_type = other DNA
                        organism = synthetic construct
SEQUENCE: 9
gcattgacgt tgggttt                                                   17

SEQ ID NO: 10           moltype = DNA  length = 20
FEATURE                 Location/Qualifiers
source                  1..20
                        mol_type = other DNA
                        organism = synthetic construct
SEQUENCE: 10
cacagccgtg cagaaaatta                                                20

SEQ ID NO: 11           moltype = DNA  length = 20
FEATURE                 Location/Qualifiers
source                  1..20
                        mol_type = other DNA
                        organism = synthetic construct
SEQUENCE: 11
gcaatgctac cagctcatca                                                20

SEQ ID NO: 12           moltype = DNA  length = 23
FEATURE                 Location/Qualifiers
source                  1..23
                        mol_type = other DNA
                        organism = synthetic construct
SEQUENCE: 12
ttttgctttg cacaccgat ttt                                             23

SEQ ID NO: 13           moltype = DNA  length = 22
FEATURE                 Location/Qualifiers
source                  1..22
                        mol_type = other DNA
                        organism = synthetic construct
SEQUENCE: 13
cacgcaccct tcaatcagga tg                                             22
```

-continued

```
SEQ ID NO: 14          moltype = DNA  length = 23
FEATURE                Location/Qualifiers
source                 1..23
                       mol_type = other DNA
                       organism = synthetic construct
SEQUENCE: 14
atggggtggt tgtgtaggat gtc                                              23

SEQ ID NO: 15          moltype = DNA  length = 24
FEATURE                Location/Qualifiers
source                 1..24
                       mol_type = other DNA
                       organism = synthetic construct
SEQUENCE: 15
gcgtagttag ccagattgtt gtcc                                             24

SEQ ID NO: 16          moltype = DNA  length = 21
FEATURE                Location/Qualifiers
source                 1..21
                       mol_type = other DNA
                       organism = synthetic construct
SEQUENCE: 16
tgctacactt taattgaagg c                                                21

SEQ ID NO: 17          moltype = DNA  length = 22
FEATURE                Location/Qualifiers
source                 1..22
                       mol_type = other DNA
                       organism = synthetic construct
SEQUENCE: 17
ttgcttgtca tcttagtaat cg                                               22

SEQ ID NO: 18          moltype = DNA  length = 23
FEATURE                Location/Qualifiers
source                 1..23
                       mol_type = other DNA
                       organism = synthetic construct
SEQUENCE: 18
tgcatgagcg atcaagtttc aag                                              23

SEQ ID NO: 19          moltype = DNA  length = 23
FEATURE                Location/Qualifiers
source                 1..23
                       mol_type = other DNA
                       organism = synthetic construct
SEQUENCE: 19
tgtcccatgt ctggttgatg act                                              23
```

ANTIMICROBIAL PEPTIDE (AMP) FOR CONTROLLING Pseudomonas syringae PV. actinidiae (PSA) AND PREPARATION METHOD AND USE THEREOF

CROSS-REFERENCE TO RELATED APPLICATION

This patent application claims the benefit and priority of Chinese Patent Application No. 2023101234937, filed with the China National Intellectual Property Administration on Feb. 7, 2023, the disclosure of which is incorporated by reference herein in its entirety as part of the present application.

REFERENCE TO SEQUENCE LISTING

A computer readable XML file entitled "DANG_GWP20230200517_ANHUI-P0001 NON-PROVISIONAL-APPLICATION_FILED-SEQUENCE-LISTING.XML", that was created on Mar. 23, 2023, with a file size of about 17,599 bytes, contains the sequence listing for this application, has been filed with this application, and is hereby incorporated by reference in its entirety.

TECHNICAL FIELD

The present disclosure belongs to the technical field of biotechnology, and in particular relates to an antimicrobial peptide (AMP) for controlling Pseudomonas syringae pv. actinidiae (PSA) and a preparation method and use thereof.

BACKGROUND

Due to a high nutritional value, kiwifruit is an important economic fruit tree crop after its wide global commercial development and production. China is the largest producer of kiwifruit, followed by New Zealand and Italy. Kiwifruit bacterial canker caused by Pseudomonas syringae pv. actinidiae (PSA) has caused serious economic losses and greatly threatens kiwifruit production. The kiwifruit bacterial canker presents a distinctive field symptoms, such as leaf spotting, flower necrosis, branch dieback, typical trunk cankers, and red or white exudates. As an aerobic Gram-negative phytopathogen, PSA has high virulence and rapid transmission properties. Since the kiwifruit bacterial canker is difficult to control, the PSA is considered to be a quarantine pathogen by the European Plant Protection Organization.

Currently, various methods have been developed to limit the spread of PSA, including regular monitoring, removal of infected plant tissues, spraying with chemicals, and the application of biological control agents and host resistance elicitors. Although chemical control has been widely used to control the kiwifruit bacterial canker, excessive reliance on chemicals (such as streptomycin and copper agents) may lead to problems such as environmental pollution, antibiotic residues, and pathogen resistance. Although antimicrobial peptides (AMPs) are used for antibacterial researches in existing biological control agents, there are no related reports on PSA control with the AMPs since the AMPs have low antibacterial activity and large molecular weight. The mechanism of action for AMPs on PSA is not yet clear, and whether the AMPs still have an anti-PSA activity in plants is also still unclear.

SUMMARY

In view of the above existing problems, the present disclosure provides an AMP for controlling PSA and a preparation method and use thereof. The AMP presents potent antimicrobial activity against the PSA both in vivo and in vitro, showing a unique mechanism of action, a low hemolytic activity, and no drug resistance induction.

To solve the above technical problems, the present disclosure provides the following technical solutions:

The present disclosure provides an AMP for controlling PSA, where the AMP has an amino acid sequence of Trp-Trp-Lys-Leu-Leu-Arg-Lys-Leu-NH$_2$ (SEQ ID NO:1 with C-terminal amidation), and the sequence includes eight amino acid residues and has a carboxyl-terminus (C-terminus) with amidation modification.

Preferably, the AMP has a molecular weight of 1,140.4 Da, an isoelectric point of 12.4, a charge of +4, a hydrophobicity of 33.60, and a typical amphiphilic structure.

The present disclosure further provides a preparation method of the AMP, where the preparation method is to artificially synthesize the AMP from the C-terminus to an amino-terminus (N-terminus) by Fmoc polypeptide solid-phase synthesis, and includes the following steps: subjecting a Rink resin to Fmoc removal, adding corresponding amino acids sequentially according to the sequence of the AMP, mixing a treated Rink resin with the amino acids, and conducting amino acid coupling repeatedly until a polypeptide is synthesized.

Preferably, the amino acids are added at 4 times a dosage of the Rink resin.

The present disclosure further provides use of the AMP in preparation of a drug for controlling PSA.

Preferably, the AMP has a minimal inhibitory concentration (MIC) of 3.13 μg/mL and a half maximal effective concentration (EC$_{50}$) of 1.67 μg/mL for the PSA.

Preferably, the drug includes components that do not affect an activity of the AMP.

Compared with the prior art, the present disclosure has the following beneficial effects:

In the present disclosure, for the first time, the AMP, Trp-Trp-Lys-Leu-Leu-Arg-Lys-Leu-NH$_2$ (SEQ ID NO:1 with C-terminal amidation), is artificially synthesized from the C-terminus to the N-terminus by Fmoc polypeptide solid-phase synthesis; meanwhile, it is pointed out that the AMP has a molecular weight of 1,140.4 Da, an isoelectric point of 12.4, a charge of +4, a hydrophobicity of 33.60, and a typical amphiphilic structure, with basic amino acids gathering on a same side. Compared with the existing AMPs with an antibacterial activity, the AMP of the present disclosure has a smaller molecular weight, is easy to synthesize artificially, and reduces a cost of artificial synthesis.

In the present disclosure, it is first found that the AMP has an antimicrobial activity against PSA, where a fused aromatic ring of tryptophan (Trp, W) in the AMP sequence is more inclined to a membrane interface of microorganisms; and the addition of arginine (Arg, R) can improve the antibacterial activity and enhance embedding of the AMP into the cell membrane of the PSA. The AMP can effectively control the PSA both in vivo and in vitro, and can be used as a bactericide for the control of PSA.

BRIEF DESCRIPTION OF THE DRAWINGS

FIG. 8A-C shows an effect of the AMP on an antibacterial activity in kiwifruit infected with the PSA (different letters represent significant differences between different treatments: P<0.05);

DETAILED DESCRIPTION OF THE EMBODIMENTS

Figure 1A:
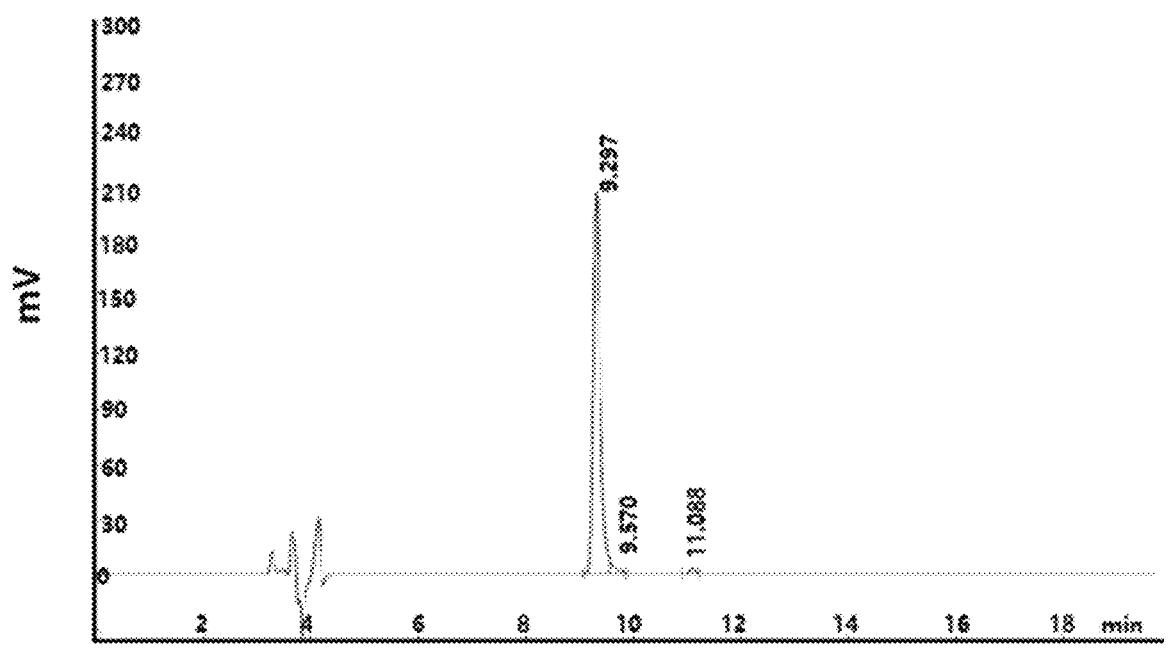
FIG. 1A and FIG. 1B show test results for a purity and a molecular weight of the AMP, respectively.

The present disclosure provides an AMP for controlling PSA, where the AMP has an amino acid sequence of Trp-Trp-Lys-Leu-Leu-Arg-Lys-Leu-NH$_2$ (WWKLLRKL-NH$_2$, SEQ ID NO: 1 with C-terminal amidation), and the sequence includes eight amino acid residues and has a carboxyl-terminus (C-terminus) with amidation modification. In the present disclosure, the eight amino acids of the AMP without amidation modification has a sequence of Trp-Trp-Lys-Leu-Leu-Arg-Lys-Leu (WWKLLRKL) shown in SEQ ID NO: 1. The AMP has a molecular weight of 1,140.4 Da, an isoelectric point of 12.4, a charge of +4, a hydrophobicity of 33.60, and a typical amphiphilic structure, with basic amino acids gathering on a same side. The AMP is a water-soluble white powder with a purity of greater than 95%.

The present disclosure further provides a preparation method of the AMP, where the preparation method is to artificially synthesize the AMP from the C-terminus to an N-terminus by Fmoc polypeptide solid-phase synthesis. In the present disclosure, the preparation method of the AMP specifically includes the following steps: (1) selecting a Rink resin for polypeptide synthesis: adding the Rink resin to a solid-phase reactor, and then adding piperidine (PIP)/N,N-dimethylformamide (DMF), and shaking the reactor for 10 min to 15 min; (2) removing the solvent by filtration, filling an obtained system with DMF, shaking the reactor for 1 min, and removing liquid by filtration; repeating the above operations 3 times; (3) adding a Kaiser reagent and a small amount of resin to a detection tube, putting the detection tube at 100° C. for 20 sec, checking whether the color of the resin changes, if the color changes, it means that Fmoc has been removed successfully, and proceeding to the next step; (4) adding 4 eq (feeding ratio, a ratio of amino acid materials to the resin obtained in step (3)) of amino acids into the reactor, and recording the ratio in a record sheet, adding 1 mL of a N,N'-diisopropylcarbodiimide (DIC)/DMF solution, shaking the reactor for 1 h to 2 h; (5) conducting operations according to step (3), if the color does not change, it means that coupling is successful; (6) repeating washing of a successfully-coupled product according to the method in step (2); (7) adding PIP/DMF to the reactor containing a washed product in step (6), and shaking the reactor for 10 min to 15 min; (8) washing a product obtained in step (7) according to the method in step (2); (9) repeating the operations in steps (3) to (8), and adding the corresponding amino acids in sequence according to the sequence of the AMP until a polypeptide is synthesized.

The present disclosure further provides use of the AMP in preparation of a drug for controlling PSA. In the present disclosure, the AMP has a MIC of 3.13 µg/mL and an EC$_{50}$ of 1.67 µg/mL for the PSA, showing an activity significantly higher than that of agricultural streptomycin (AS). The pathogen of the kiwifruit bacterial canker is PSA. The AMP targets the cell membrane of PSA, increases membrane permeabilization and dissipates a membrane potential, leading to calcium ion leakage; the AMP can cause morphological destruction and internal structure changes of PSA cells; the AMP can penetrate the cell membrane, bind with PSA DNA, and affect the expression levels of DNA replication and repair genes; the AMP also reduces the activity of intracellular esterases and induces the generation of ROS. The AMP has a disease control effect of 70.53% on kiwifruit leaves inoculated with PSA, which is better than that of agricultural streptomycin. In the leaves of kiwifruit inoculated with PSA, the expression levels of defense genes (PR 1 and PR-10) of kiwifruit are significantly increased after the AMP treatment, which has the ability to induce plant defense responses. Within a detected concentration range, the AMP has only a low hemolytic activity toward rabbit erythrocytes; the PSA cells are repeatedly treated with the AMP, and no drug resistance of PSA to AMP is observed within a detection time range.

In the present disclosure, unless otherwise specified, all raw material components are commercially available products well known to persons skilled in the art.

The technical solutions of the present disclosure will be clearly and completely described below with reference to the examples of the present disclosure. Apparently, the described examples are only a part of, not all of, the examples of the present disclosure. All other examples obtained by a person of ordinary skill in the art based on the examples of the present disclosure without creative efforts shall fall within the protection scope of the present disclosure.

Example 1 Synthesis of an AMP (WWKLLRKL-NH$_2$, SEQ ID NO:1 with C-Terminal Amidation)

By Fmoc polypeptide solid-phase synthesis, the AMP was artificially synthesized from a C-terminus to an N-terminus, and a preparation method included the following steps:

(1) Rink resin was selected for polypeptide synthesis: the Rink resin was added to a solid-phase reactor, PIP/DMF was added to the solid-phase reactor, and the reactor was shaken for 12.5 min;

(2) the solvent was removed by filtration, an obtained system was filled with DMF, the reactor was shaken for 1 min, and liquid was removed by filtration; the above operations were repeated for 3 times;

(3) a Kaiser reagent and a small amount of resin were added to a detection tube, the detection tube was put at 100° C. for 20 sec, whether the color of the resin changes was checked, if the color changed, it meant that Fmoc had been removed successfully, and proceeding to the next step;

(4) 4 eq (feeding ratio, a ratio of amino acid materials to the resin obtained in step (3)) of amino acids were added into the reactor, and the ratio was recorded in a record sheet, 1 mL of a DIC/DMF solution was added, the reactor was shaken for 1.5 h;

(5) operations were conducted according to step (3), if the color did not change, it meant that coupling was successful;

(6) washing of a successfully-coupled product was repeated according to the method in step (2);

(7) PIP/DMF was added to the reactor containing a washed product in step (6), and the reactor was shaken for 12.5 min;

(8) a product obtained in step (7) was washed according to the method in step (2);

(9) the operations in steps (3) to (8) were repeated, and the corresponding amino acids were added in sequence according to the sequence of the AMP until a polypeptide was synthesized.

Example 2 Physicochemical Properties and Spatial Structure Analysis of the AMP

1. By HPLC and mass spectrometer, a purity and a molecular weight of the AMP synthesized in Example 1 were detected and analyzed. The purity detection analysis was conducted by HPLC, at a sample volume: 5 μL, a detection wavelength: 220 nm, and a flow rate: 1 mL/min. The molecular weight determination analysis was conducted using an Agilent-6125B mass spectrometer, with a probe: ESI, at a flow rate: 0.2 mL/min.

Figure 1B:
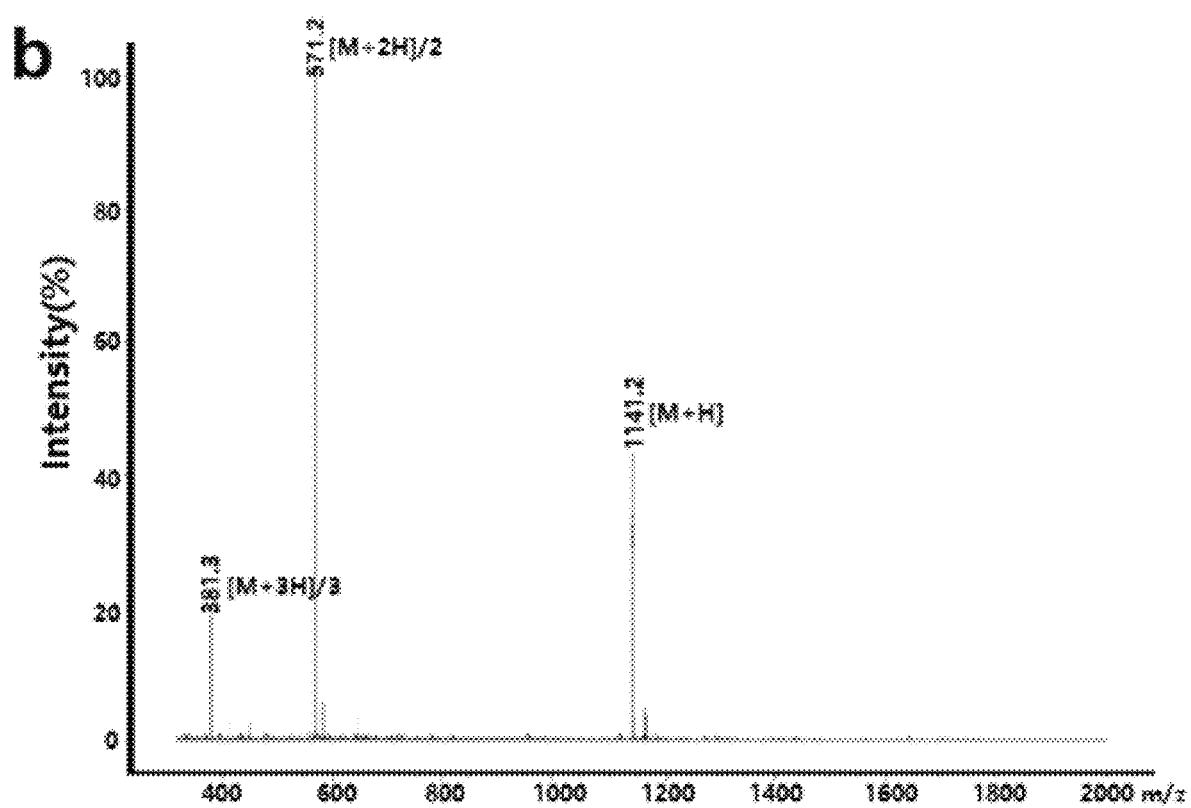

It was seen from FIG. 1A-B that detected by HPLC, the prepared AMP had a peak elution time of 9.297 min (FIG. 1A), a left-right symmetrical peak pattern, and a purity of as high as 96.40%. As determined by MS, the AMP had a molecular weight of 1,140.4 Da (FIG. 1B)

2. Helical Wheel Diagram and Structures Simulation of the AMP

According to the analysis by a polypeptide calculator, the AMP had an isoelectric point of 12.4, a charge of +4, and a hydrophobicity of 33.60, which was a basic AMP.

Figure 2A:
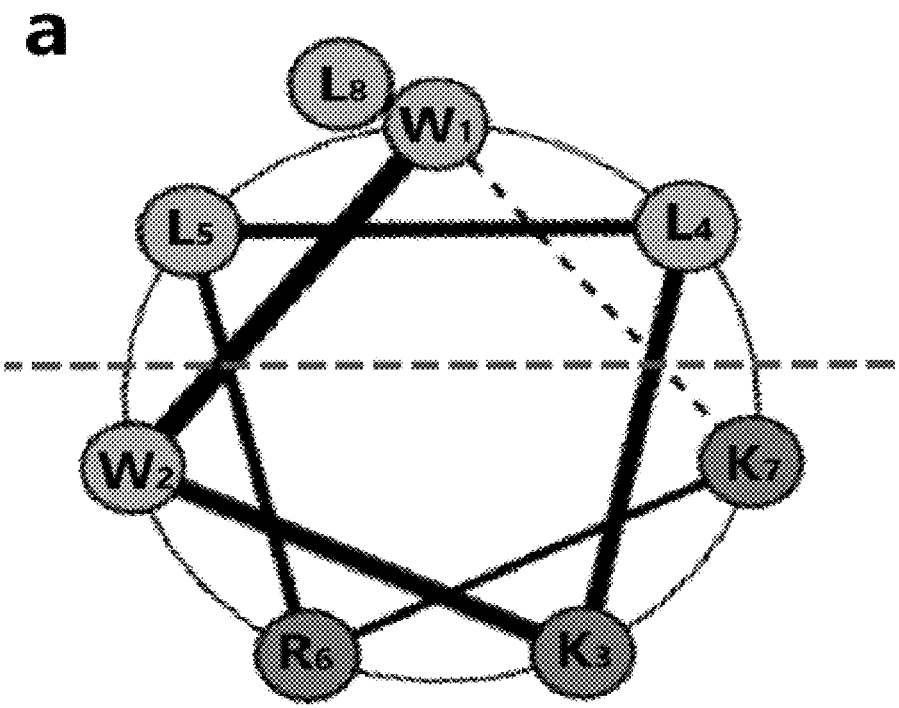
FIG. 2A and FIG. 2B show a helical wheel diagram and a structures simulation of the AMP, respectively.
Figure 2B:
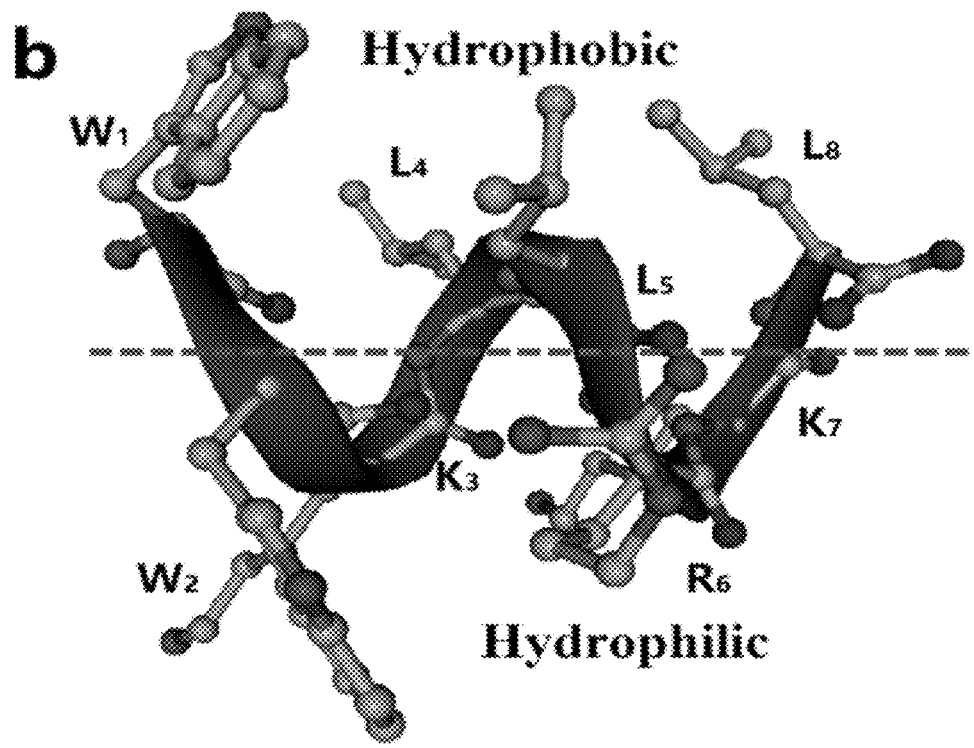

The helical wheel diagram of the AMP was constructed using online software DrawCoil 1.0. The spatial structure of the AMP was simulated using an online workstation PEP-FOLD3.5. The results were shown in FIG. 2A-B, the AMP had a typical amphiphilic structure; where basic amino acids were gathered on a same side of the AMP to form a hydrophilic side; and hydrophobic amino acids were gathered on the other side of the AMP, forming a hydrophobic side.

Example 3 Detection of an Antimicrobial Activity of the AMP on PSA

1. Determination of MIC

The MIC was determined by a broth microdilution method (Mishra et al., 2017, Individual and combined effects of engineered peptides and antibiotics on *Pseudomonas aeruginosa* biofilms). PSA cells in a logarithmic growth phase were diluted to $10^5$ colony forming units (CFU)/mL with an LB liquid medium (including 10 g/L peptone, 5 g/L yeast extract powder, and 10 g/L NaCl), and added into a 96-well microplate that was preloaded with different concentrations of the AMP synthesized in Example 1 (1.56 μg/mL to 200 μg/mL) or agricultural streptomycin (AS) (125 μg/mL to 4,000 μg/mL). After incubation at 28° C. for 24 h, an absorbance at 600 nm ($OD_{600}$) of each sample was measured using a Multiskan FC microplate reader (Thermo Fisher Scientific, Waltham, USA); while sterile water was used as a control. The measurement results showed that the MIC of AMP to PSA was 3.13 μg/mL, and the MIC of AS to PSA was 500 μg/mL, indicating that the antimicrobial activity of AMP of the present disclosure to PSA was significantly better than that of the AS.

2. Determination of Minimum Bactericidal Concentration (MBC)

The samples in the wells with a concentration of greater than 1 MIC during the MIC determination in step 1 were spread on an LB agar plate (including 10 g/L peptone, 5 g/L yeast extract powder, 10 g/L NaCl, and 15 g/L agar), and the colonies were counted after incubation at 28° C. for 48 h. The measurement results showed that the MBC of AMP to PSA was 6.25 μg/mL, and the MBC of AS to PSA was 1,000 μg/mL, indicating that the antimicrobial activity of AMP of the present disclosure to PSA was significantly better than that of the AS.

3. Determination of $EC_{50}$

The $EC_{50}$ was determined according to a method of Gupta et al. (2015, Short, synthetic cationic peptides have antibacterial activity against *Mycobacterium smegmatis* by forming pores in membrane and synergizing with antibiotics). The PSA cells ($10^5$ CFU/mL) in a logarithmic growth phase were added to a 96-well microplate that was preloaded with different concentrations of the AMP synthesized in Example 1 (0.39 μg/mL to 12.5 μg/mL) or AS (62.5 μg/mL to 2,000 μg/mL), and then incubated at 28° C. for 3 h. A serially diluted mixture was spread on the LB agar plate, incubated for 48 h, and the colonies were counted. The $EC_{50}$ was calculated by plotting percent killing as a function of the lg of AMP concentrations. The measurement results showed that the $EC_{50}$ of AMP to PSA was 1.67 μg/mL, and the $EC_{50}$ of AS to PSA was 262.90 g/mL, indicating that the antimicrobial activity of AMP of the present disclosure to PSA was significantly better than that of the AS.

Example 4 Researches on a Mechanism of Action of the AMP Against PSA Cells

1. AMP Acting on the PSA Cell Membrane to Cause Calcium Ion Leakage

Membrane permeabilization was determined according to a method of Dang et al. (2020, Antimicrobial peptides from the edible insect *Musca domestica* and their preservation effect on chilled pork). PSA cells ($10^7$ CFU/mL) in a logarithmic growth phase were incubated with 1 MIC of the AMP synthesized in Example 1 at 28° C. for 120 min. The resulting cultures were filtered through a 0.22 μm membrane and $OD_{260}$ value of the filtrates were determined. 10 mM of a phosphate-buffered saline (PBS) and Triton X-100 were used as negative and positive controls, respectively. The membrane permeabilization was calculated according to the following formula: Permeabilization (%)=($OD_{260}$ AMP/$OD_{260\ Triton}$)×100%.

Figure 3A:
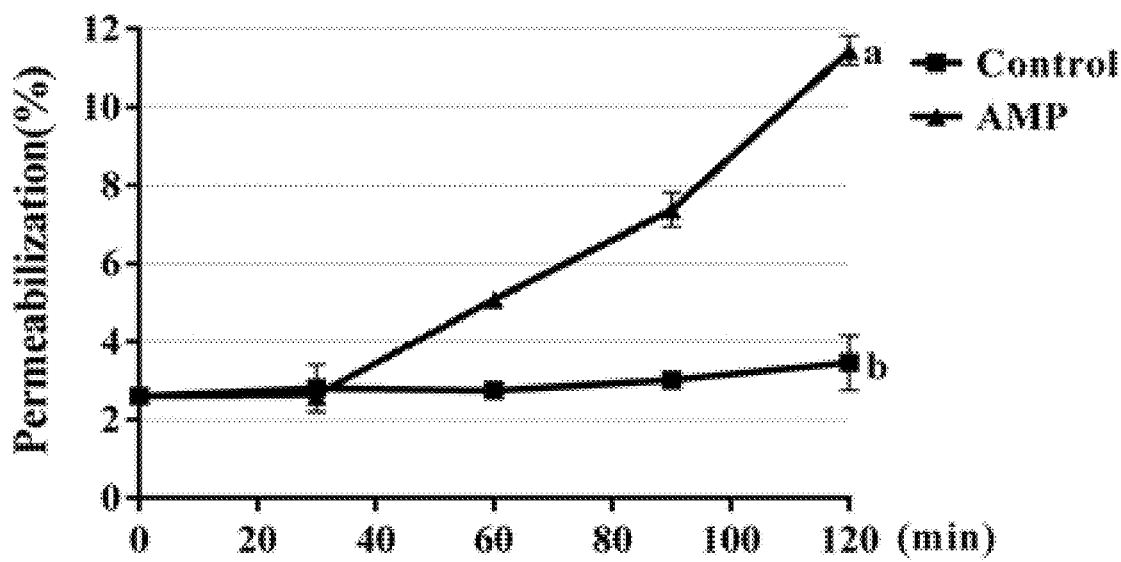
FIG. 3A and FIG. 3B show an impact result of the AMP on membrane permeabilization and calcium ion leakage of the PSA cells, respectively (Control: PBS, different letters represent significant differences between different treatments: P<0.05)
Figure 3B:
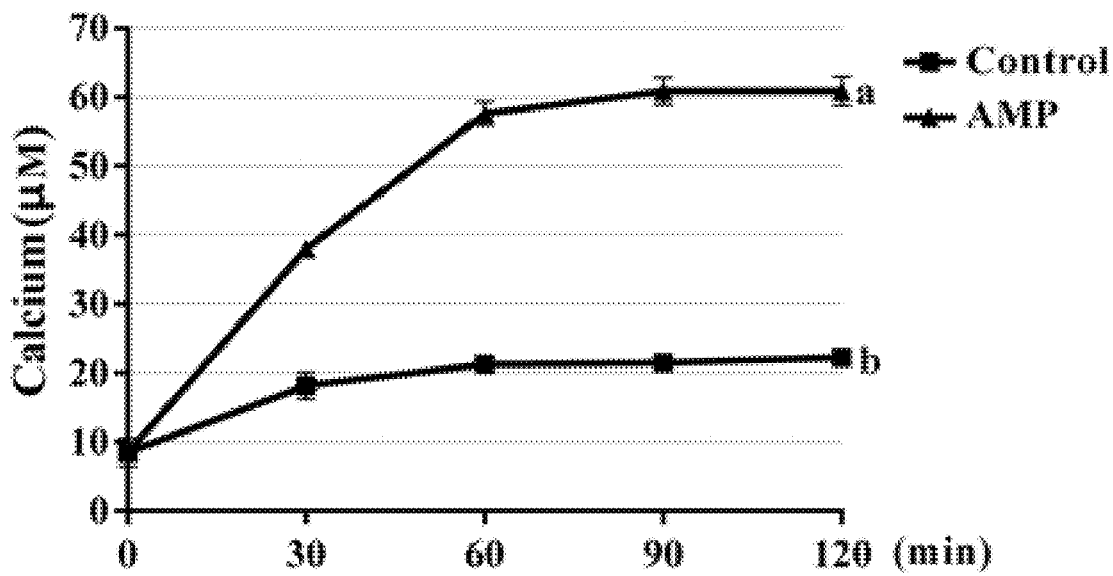

As shown in FIG. 3A, AMP treatment increased the permeabilization of the cell membrane of PSA. After the AMP treatment for 120 min, the permeabilization of the PSA cell membrane increased from 2.61% to 11.44%. It was seen from FIG. 3B that after PSA cells were exposed to the AMP, calcium ions were immediately released outside the cells; after 120 min of treatment, calcium ion leakage increased from 8.70 μM to 60.87 μM, which was significantly higher than that of the control group, indicating that the AMP could cause calcium ion leakage in PSA.

2. Effect of the AMP on Membrane Depolarization of the PSA Cells

Membrane depolarization was measured using a membrane potential-sensitive cyano dye 3,3'-dipropylthiadicarbocyanine iodide ($DiSC_3(5)$) according to a method of Juba et al. (2015, Helical cationic antimicrobial peptide length and its impact on membrane disruption). PSA cells ($10^7$ CFU/mL) were suspended in a PBS containing 50 μg/mL of the DiSC$_3$(5) and added to a black 96-well microplate. The microplate was incubated in a SpectraMax i3 microplate reader (Molecular Devices, San Jose, USA), and monitored until fluorescence leveled off. 1 MIC of the AMP synthesized in Example 1 was added and incubated at 28° C. for 30 min; while the PBS was used as a control. The fluorescence intensity of each sample was measured at excitation/emission wavelengths of 622 nm/670 nm, respectively.

Figure 4:
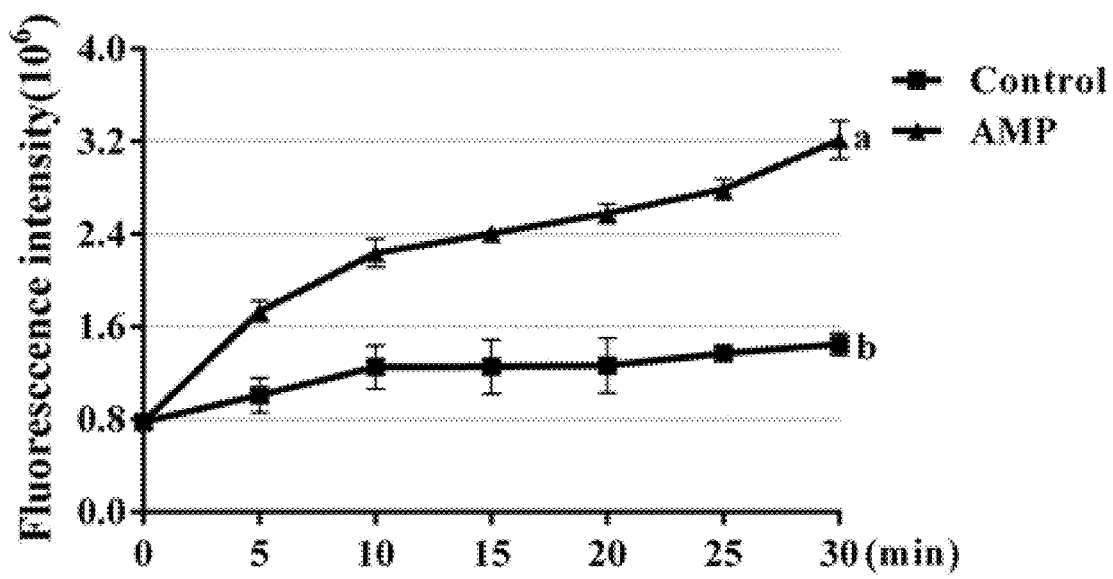
FIG. 4 shows an effect of the AMP on depolarization of the cell membrane of the PSA (different letters represent significant differences between different treatments: P<0.05)

As shown in FIG. 4, 1 MIC of the AMP treatment significantly induced an increase in DiSC$_3$ (5) fluorescence, indicating that the AMP treatment resulted in membrane depolarization of PSA cells.

3. Scanning and Transmission Electron Microscopy Observation of PSA Cells

Scanning electron microscopy (SEM) and Transmission electron microscopy (TEM) were used to observe the morphological and intracellular changes of the PSA cells treated with the AMP synthesized in Example 1. PSA cells ($10^7$ CFU/mL) were incubated with the AMP (1 MIC) for 2 h at 28° C.; while sterile water was used as a control. For SEM, cell samples were prepared according to a protocol of Juba et al. (2015, Helical cationic antimicrobial peptide length and its impact on membrane disruption) and observed under a Hitachi SU8100 SEM (Tokyo, Japan). For TEM, cell samples were prepared according to a method of Nguyen et al. (2021, Comparison of two transmission electron microscopy methods to visualize drug-induced alterations of gram-negative bacterial morphology) and observed under a Hitachi HT-7700 TEM (Tokyo, Japan).

Figure 5A:
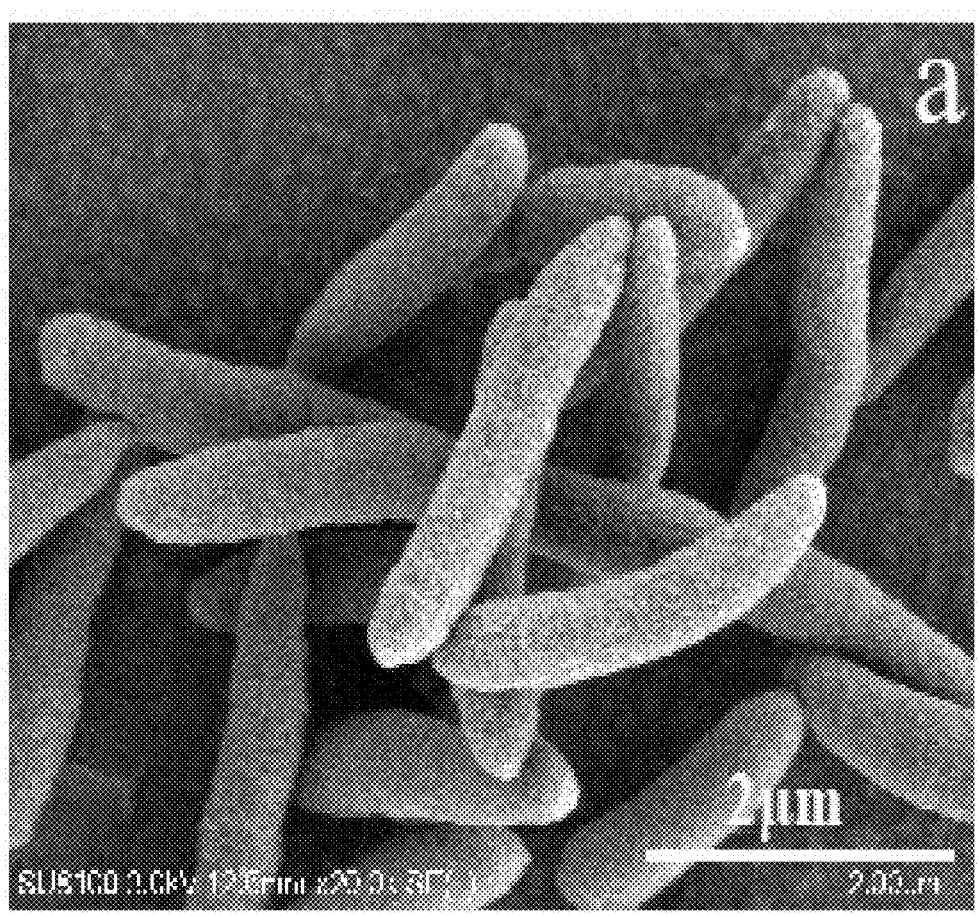
FIG. 5A to FIG. 5D show observation results of scanning electron microscopy (SEM) images of PSA cells treated with the AMP.
Figure 5B:
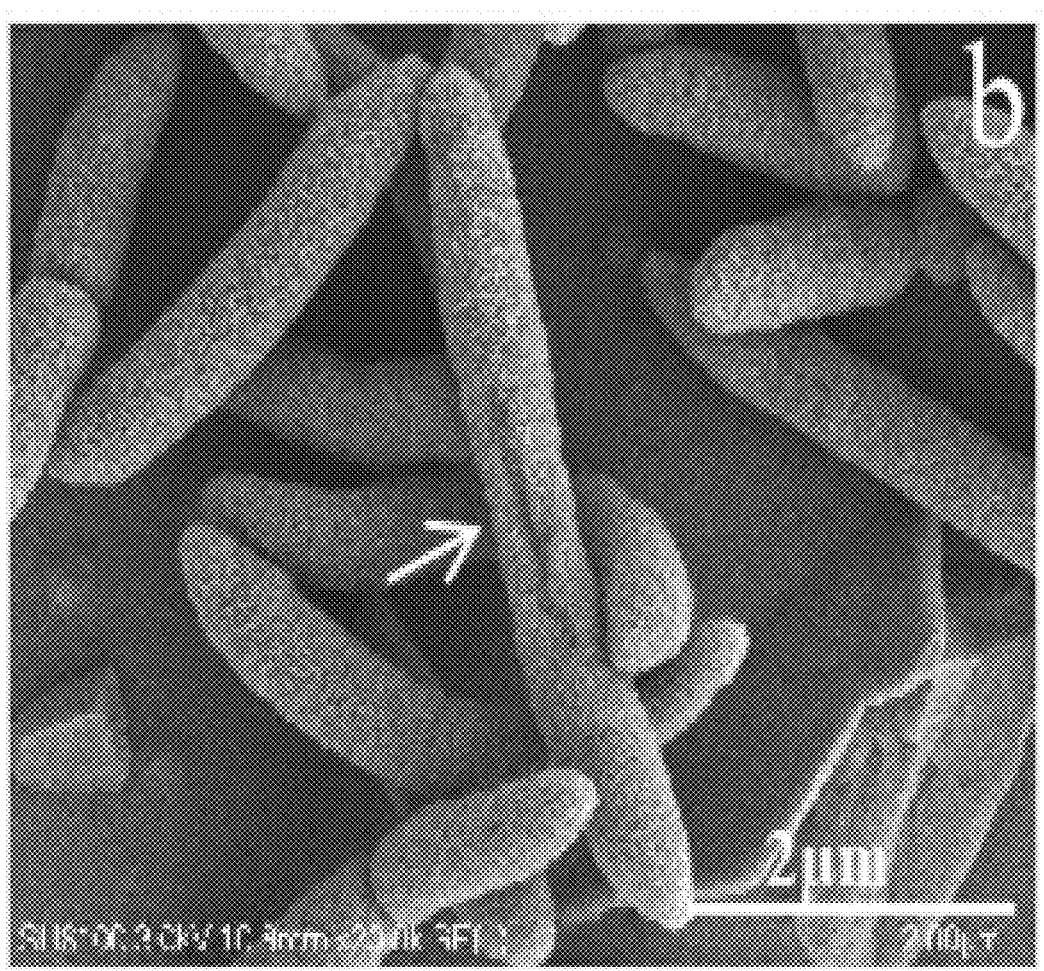
Figure 5C:
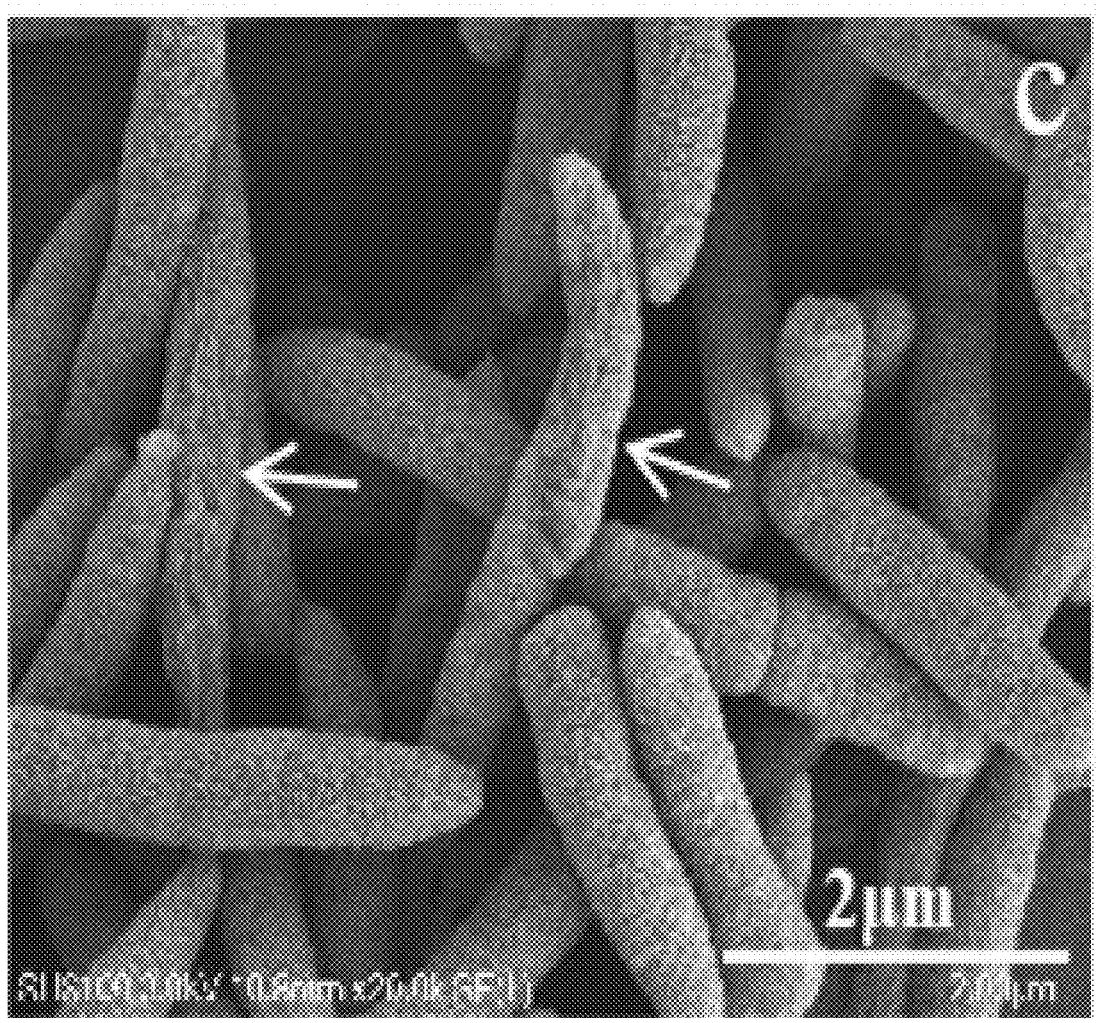
Figure 5D:
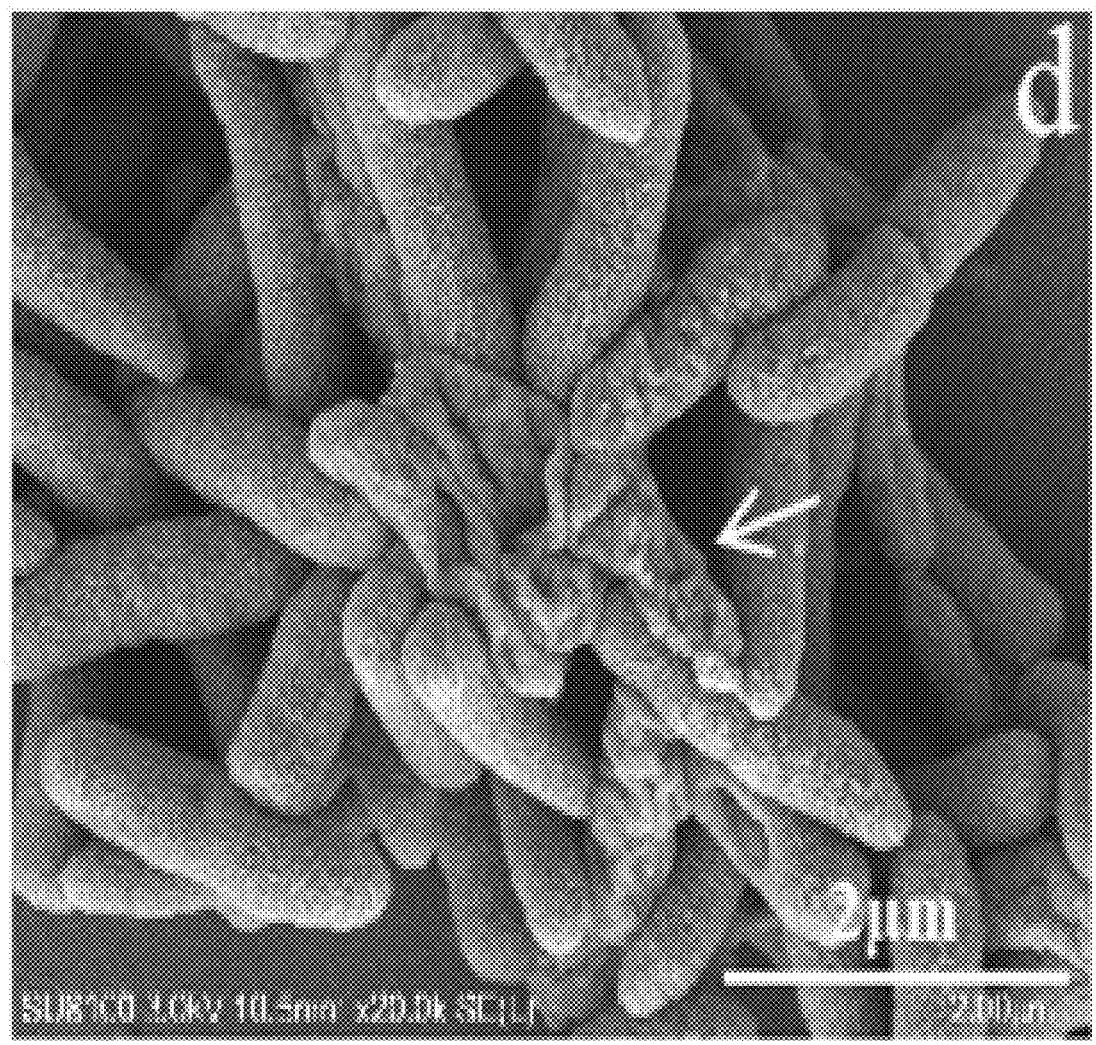
Figure 5E:
FIG. 5E to FIG. 5I show transmission electron microscopy (TEM) images of PSA cells treated with the AMP (FIG. 5A and FIG. 5E: control (sterile water))
Figure 5F:
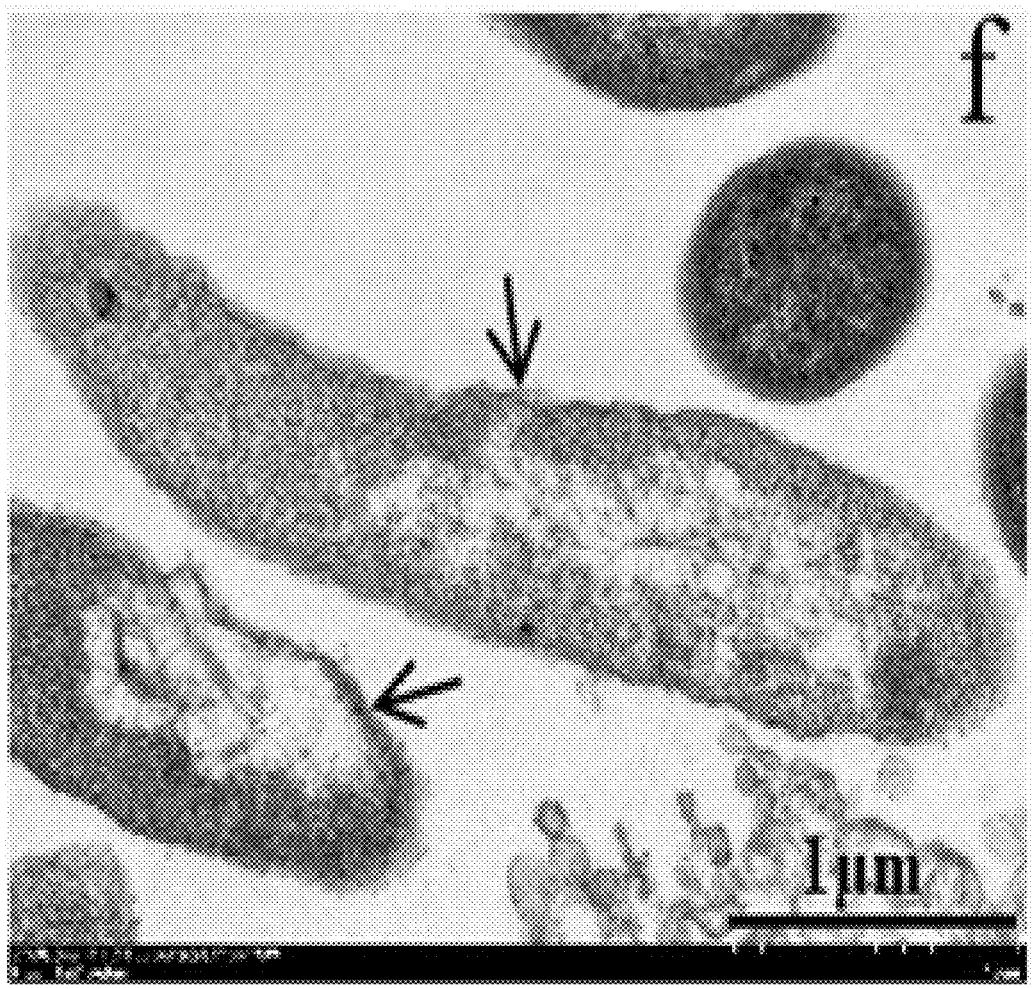
Figure 5G:
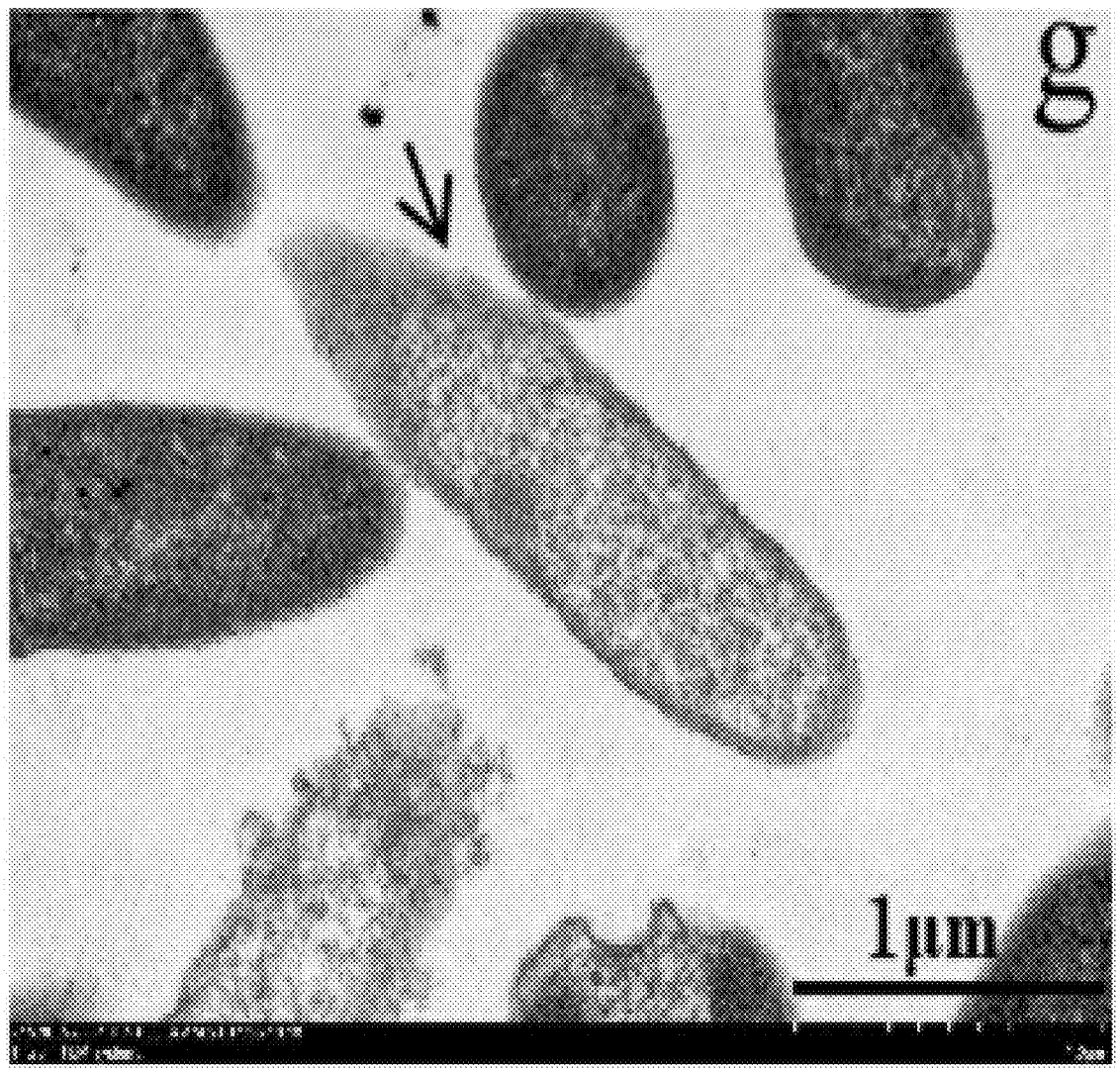
Figure 5H:
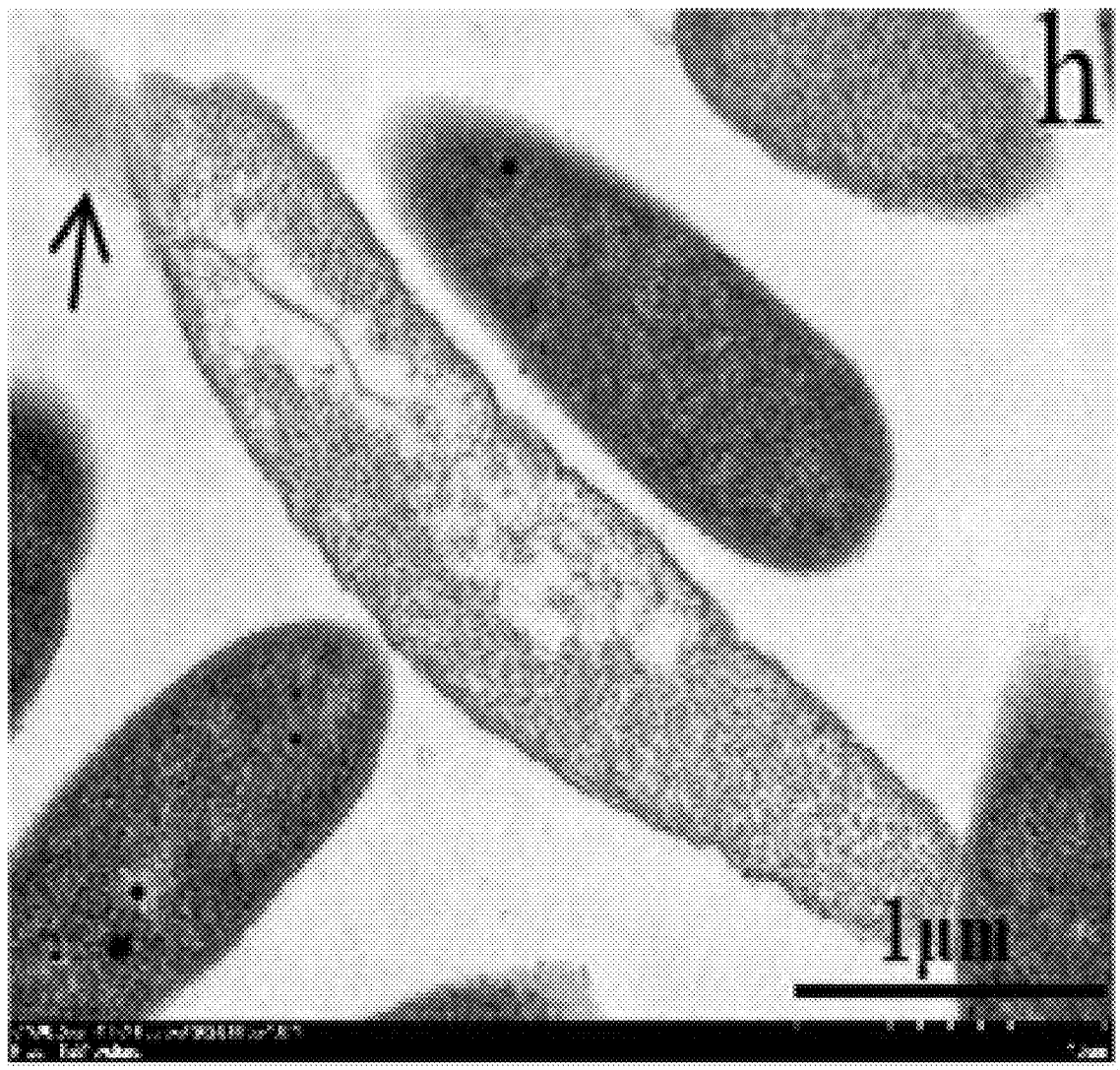
Figure 5I:
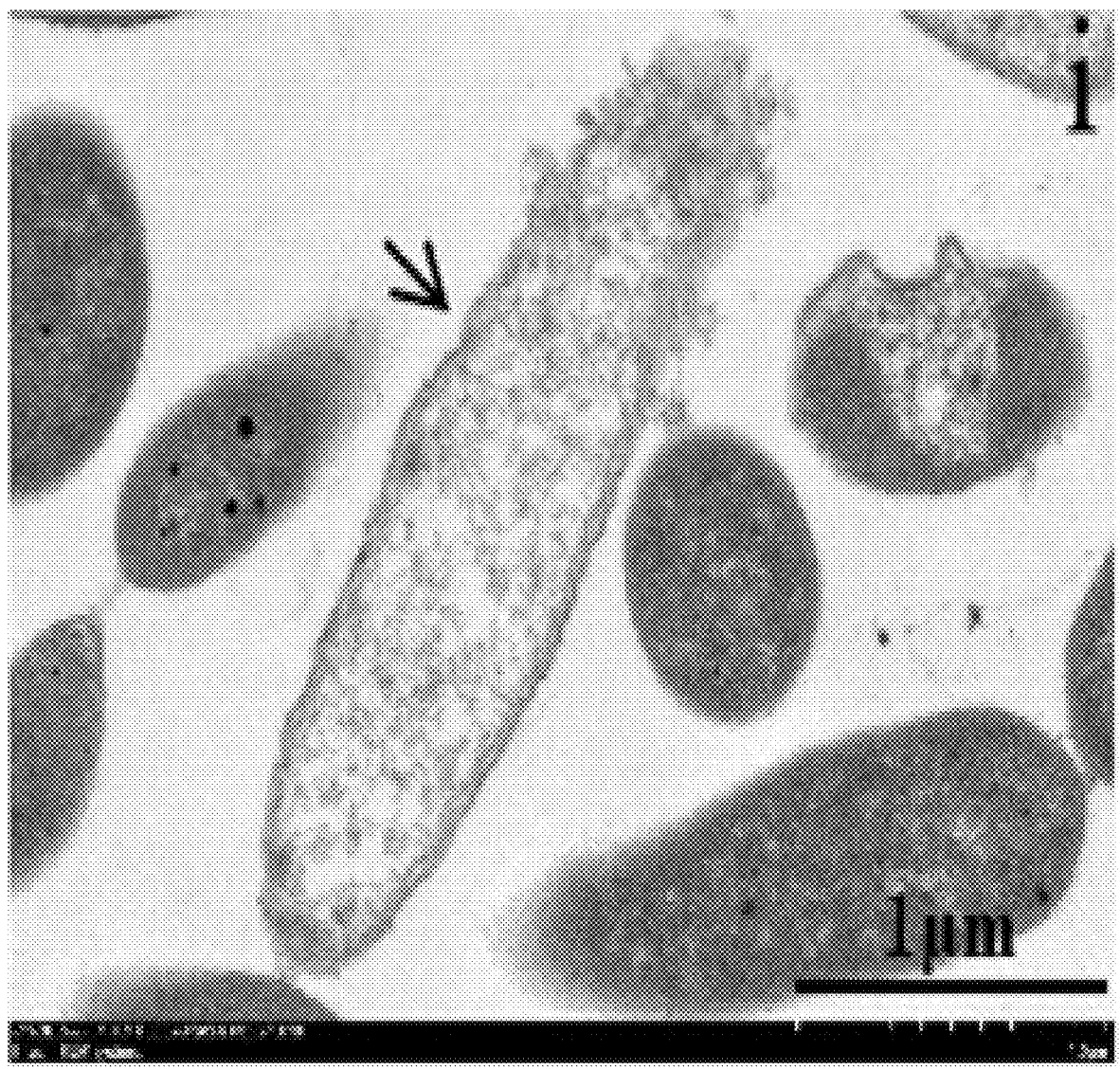

As shown in FIG. 5A, SEM observation showed that the cell membrane of the cells in the control group was intact and the cell surface was smooth; in contrast, exposure of PSA to AMP resulted in notable alterations in cell morphology, including cell surface depressions (FIG. 5B), cell shrinkage (FIG. 5C), and empty cells due to leakage of cell contents (FIG. 5D). TEM observation showed that cells in the control group exhibited dense cytoplasm enveloped by a intact cell membrane (FIG. 5E); in contrast, cells treated with AMP exhibited an uneven electron density (FIG. 5F), cell membrane rupture (FIG. 5G), leakage of cell contents (FIG. 5H), and formation of empty cells (FIG. 5I).

4. Effect of the AMP on Gene Expression of DNA Replication and Repair in PSA

In order to determine the localization of AMP in PSA cells, PSA cells were simultaneously stained with FITC-AMP and 4′,6-diamidino-2-phenylindole (DAPI) according to a method of Chang et al. (2021, Antimicrobial activity of the peptide LfcinB15 against *Candida albicans*). PSA cells ($10^7$ CFU/mL) were incubated with 1 MIC of the FITC-AMP at 28° C. for 1 h. For DNA staining, cells were incubated with 0.1 μg/mL of the DAPI for 10 min, and then observed at 60× on a Zeiss LSM800 CLSM (Carl Zeiss, Jena, Germany). Results were shown in FIG. 6A.

A PSA genomic DNA (200 ng) was incubated with different amounts of the AMP (15.63 ng to 1,000 ng) synthesized in Example 1 at 28° C. for 30 min. At the same time, sterile water was set as a control. After electrophoresis, DNA gel retardation was observed under UV illumination using a Bio-Rad Universal Hood II Gel Doc XR system (Hercules, USA). Results were shown in FIG. 6B.

PSA cells ($10^7$ CFU/mL) were incubated with 1 MIC of the AMP synthesized in Example 1 at 28° C. for 2 h. At the same time, sterile water was set as a control. A total RNA was extracted, and cDNA was synthesized using PrimeScript RT Master Mix (Takara, Dalian, China). The expression of DNA replication (dnaA and dnaB) and DNA repair (recA and recN) genes were detected by reverse transcription-quantitative PCR (RT-qPCR). The RT-qPCR was conducted with a mixed system including 10 μL of Masser Mix (Tsinke, Beijing, China), 0.8 μL of each primer (0.5 μM), 0.4 μL (200 ng) of the cDNA, and 8 μL of water. The reaction was conducted by: at 50° C. for 2 min; initial denaturation at 95° C. for 2 min; and at 95° C. for 15 sec, at 55° C. for 30 sec, and at 72° C. for 30 sec, conducting 40 cycles. 16S rRNA was used as a reference gene. The primers used in this method were listed in Table 1. A relative expression level of genes was calculated by a 2-AACT method. Results were shown in FIG. 6C.

TABLE 1

Primer sequences

| Species | Primer | Primer sequence (5′-3′) | Function |
|---|---|---|---|
| PSA | dnaA-F | TGCCCACTCGCACTTCA (SEQ ID NO: 2) | DNA replication |
| | dnaA-R | TCCCGACCACCAAACAC (SEQ ID NO: 3) | |
| | dnaB-F | TGCTGTCACGCCTCAA (SEQ ID NO: 4) | DNA replication |
| | dnaB-R | GCCGCAGAATGAAATG (SEQ ID NO: 5) | |
| | recA-F | TCAAGAACGCCAACTGC (SEQ ID NO: 6) | DNA repair |
| | recA-R | TCGCTACCGACAACCTC (SEQ ID NO: 7) | |
| | recN-F | CCGCCATTATCAGGAGA (SEQ ID NO: 8) | DNA repair |
| | recN-R | GCATTGACGTTGGGTTT (SEQ ID NO: 9) | |
| | 16S-F | CACAGCCGTGCAGAAAATTA (SEQ ID NO: 10) | Reference gene |
| | 16S-R | GCAATGCTACCAGCTCATCA (SEQ ID NO: 11) | |
| | PSA-F | TTTTGCTTTGCACACCCGATTTT (SEQ ID NO: 12) | 16S-23S rDNA-ITS |
| | PSA-R | CACGCACCCTTCAATCAGGATG (SEQ ID NO: 13) | |

TABLE 1-continued

Primer sequences

| Species | Primer | Primer sequence (5'-3') | Function |
|---|---|---|---|
| Kiwifruit | PR1-F | ATGGGGTGGTTGTGTAGGATGTC (SEQ ID NO: 14) | Defense gene |
|  | PR1-R | GCGTAGTTAGCCAGATTGTTGTCC (SEQ ID NO: 15) |  |
|  | PR-10-F | TGCTACACTTTAATTGAAGGC (SEQ ID NO: 16) | Defense gene |
|  | PR-10-R | TTGCTTGTCATCTTAGTAATCG (SEQ ID NO: 17) |  |
|  | Actin-F | TGCATGAGCGATCAAGTTTCAAG (SEQ ID NO: 18) | Reference gene |
|  | Actin-R | TGTCCCATGTCTGGTTGATGACT (SEQ ID NO: 19) |  |

Figure 6A:
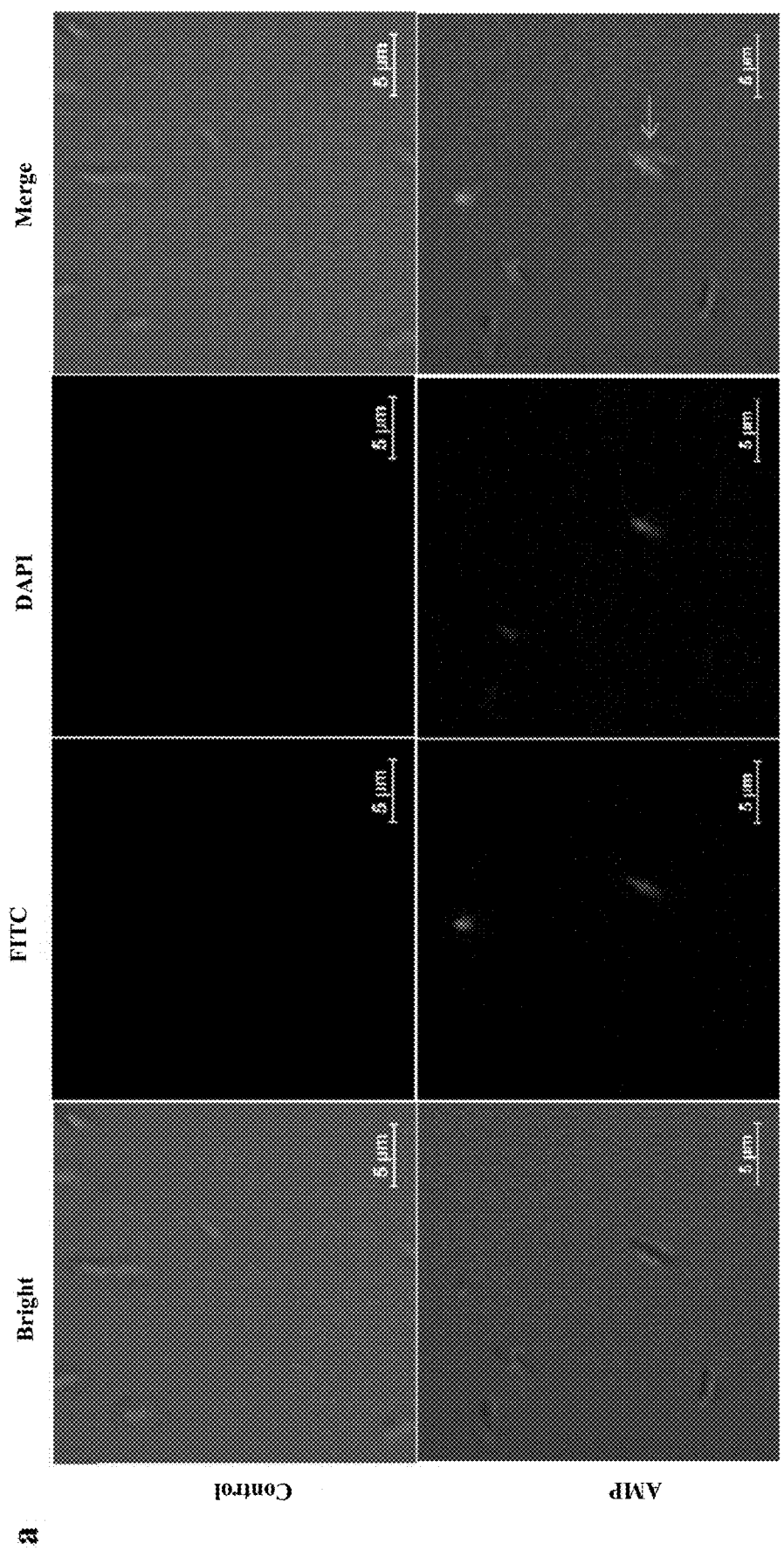
FIG. 6A to FIG. 6C show localization of the AMP, a binding activity of the AMP with DNA, and an impact result of the AMP on gene expression of DNA replication and repair, respectively (different letters represent significant differences between different treatments: P<0.05)

As shown in FIG. 6A, compared with the control group, FITC-AMP-treated PSA cells showed green fluorescence under CLSM, indicating that the peptide penetrated the cell membrane and entered the cells. When simultaneously stained with both FITC-AMP and DAPI, FITC-AMP was observed to co-localize with DAPI in cells, indicating that this peptide interacted with PSA DNA.

Figure 6B:
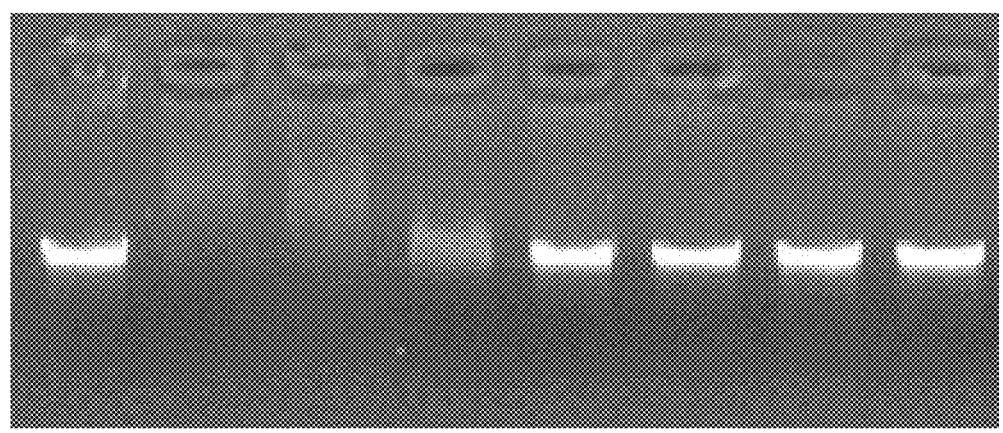

As shown in FIG. 6B, the AMP could bind to the genomic DNA of PSA and retard the migration of DNA in a concentration-dependent manner.

Figure 6C:
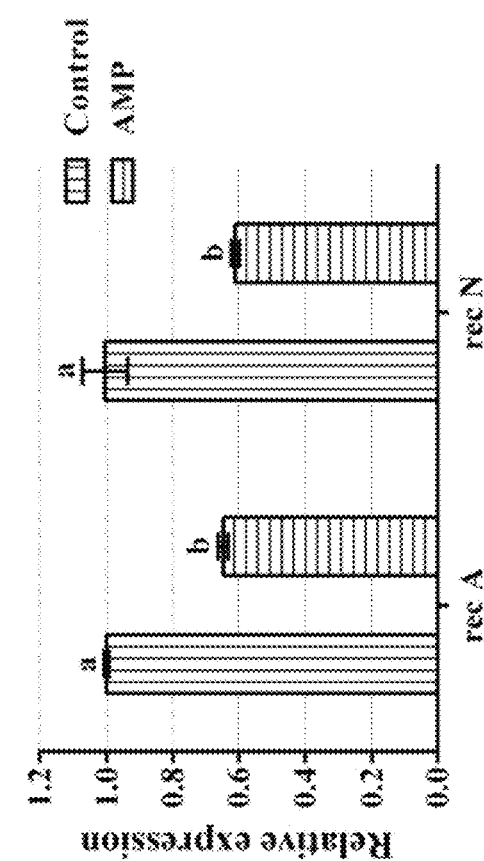
Figure 6C:
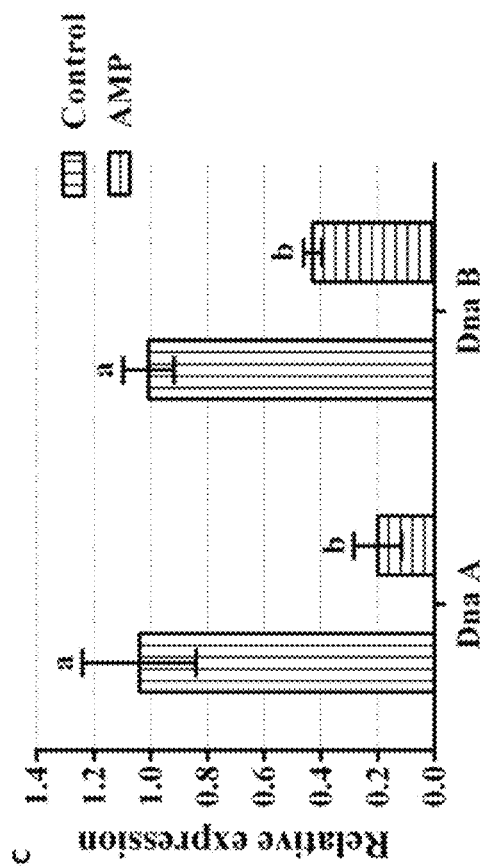

As shown in FIG. 6C, AMP treatment decreased the expression level of DNA replication and repair genes in PSA. Compared with the control group, after the AMP treatment, the expression levels of dnaA and dnaB were significantly reduced by 80.64% and 57.51%, respectively. For genes related to DNA repair, the expression levels of recA and recN were significantly reduced by 35.28% and 39.23% after the AMP treatment compared with those of the control group.

5. Effect of the AMP on ROS Level and Intracellular Esterase Activity in PSA Cells The reactive oxygen species (ROS) level of PSA treated with the AMP synthesized in Example 1 was evaluated using a ROS detection kit (LabLead, Beijing, China). PSA cells ($10^7$ CFU/mL) were incubated with different concentrations of the AMPs (0.5 MIC to 2 MICs) at 28° C. for 2 h. At the same time, sterile water was set as a control. The cells were resuspended in PBS and then incubated with 10 µM of 2',7'-dichlorodihydrofluorescein diacetate (DCFH-DA) for 30 min at 28° C. Fluorescence intensity was measured at excitation/emission wavelengths of 485 nm/525 nm using a SpectraMax i3 microplate reader (Molecular Devices, San Jose, USA).

The intracellular esterase activity of PSA was measured with fluorescein diacetate (FDA). PSA cells ($10^7$ CFU/mL) were added to a black 96-well microplate preloaded with 1 MIC of the AMP synthesized in Example 1. The cells in each well were mixed with 10 mM of the FDA and incubated at 28° C. for 10 min. Fluorescence intensity was measured at excitation wavelengths of 480 nm/530 nm using the SpectraMax i3 microplate reader (Molecular Devices, San Jose, USA), respectively.

Figure 7A:
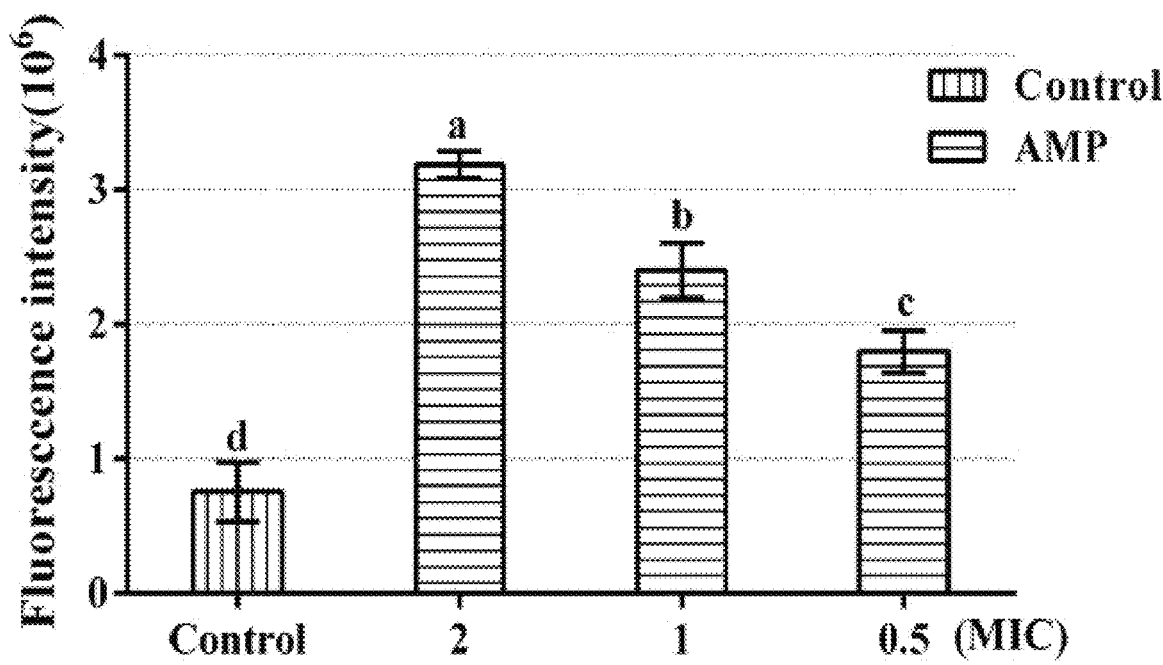
FIG. 7A and FIG. 7B show an effect of the AMP on ROS level and intracellular esterase activity in PSA cells, respectively (different letters represent significant differences between different treatments: P<0.05)

As shown in FIG. 7A, the intracellular ROS level of PSA after AMP treatment was determined by measuring the fluorescence intensity; when treated with AMP, the fluorescence intensity increased in a dose-dependent manner; at 2 MIC, the fluorescence intensity of AMP-treated PSA was 4.22 times that of the control, indicating that AMP induced the generation of intracellular ROS.

Figure 7B:
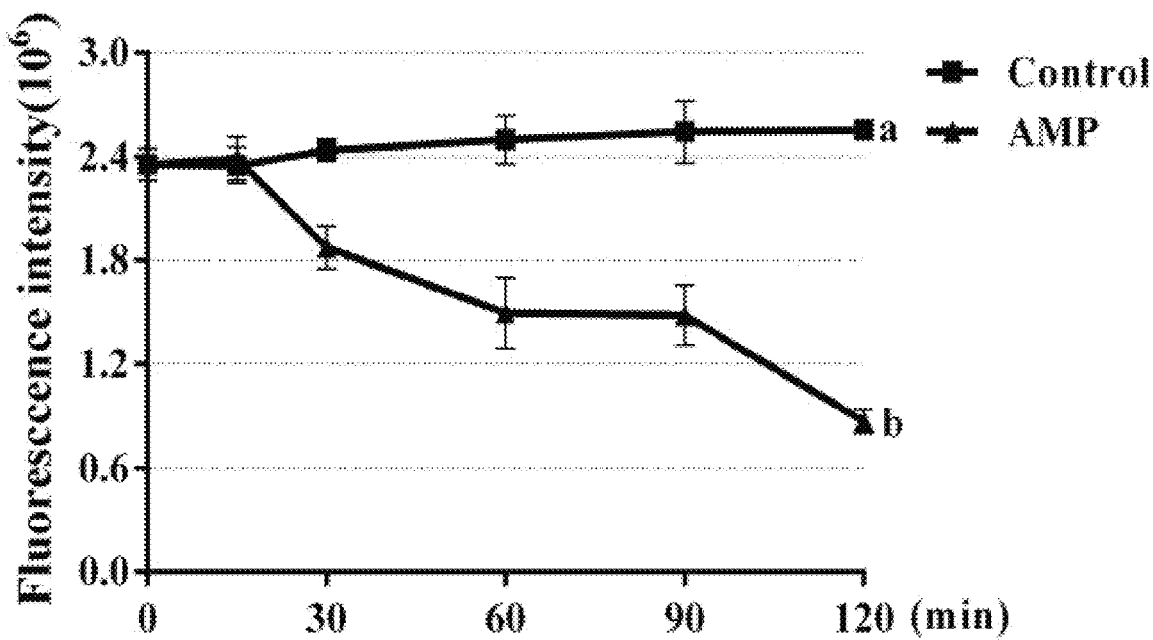

As shown in FIG. 7B, the fluorescence intensity of PSA decreased after being treated with AMP; at 120 min, the fluorescence intensity of PSA treated with AMP was 0.34 times that of the control, indicating that AMP treatment could significantly reduce the esterase activity of PSA.

Example 5 Research of an Antimicrobial Activity of the AMP in Kiwifruit Infected with PSA The method of Bai et al. (2022, Application of phage therapy against red-fleshed kiwifruit canker) was selected to evaluate a control effect of the AMP synthesized in Example 1 on kiwifruit leaves inoculated with PSA. The leaves were injured with a syringe needle and covered with a filter paper ($\phi$=1 cm) containing 50 µL of PSA ($10^8$ CFU/mL). After 2 h, 1 MIC of AMP or AS was added; while the PBS was used as a control. The kiwifruit plants were cultured for 96 h at 25±1° C., 70±5% relative humidity (RH), and a photoperiod of 16 h: 8 h. The lesion area and the number of colonies were counted every 48 h, and the disease control effect (%) was calculated using the following formula:

Control effect (%)=(1−Lesion area$_{treatment}$/Lesion area$_{control}$)×100%

Bacterial load in leaves was determined according to a colony count method of Barrett-Manako et al. (2021, Real-time PCR and droplet digital PCR are accurate and reliable methods to quantify *Pseudomonas syringae* pv. *actinidiae* biovar 3 in kiwifruit infected plantlets). Leaves were collected, washed with sterile water, and homogenized with PBS. A homogenate was inoculated into a King's B solid medium (supplemented with nitrofurantoin at 12.5 µg/mL and cephalexin at 40 µg/mL). After incubation at 28° C. for 48 h, the colonies were counted to calculate lg CFU/cm². Colonies were confirmed by PCR using specific primers for the 16S-23SrDNA-ITS sequence of PSA (Table 1), and sequenced.

The expression of defense genes (PRI and PR-10) in kiwifruit leaves was detected by RT-qPCR. The leaves were collected 48 h after AMP inoculation with PSA, and a total RNA was extracted from three leaf discs for each replicate, and cDNA was synthesized. The RT-qPCR was conducted using the method in Example 4. Actin was used as a reference gene. Table 1 showed a list of primers. A relative expression level of genes was calculated by a 2-AACT method.

Figure 8A:
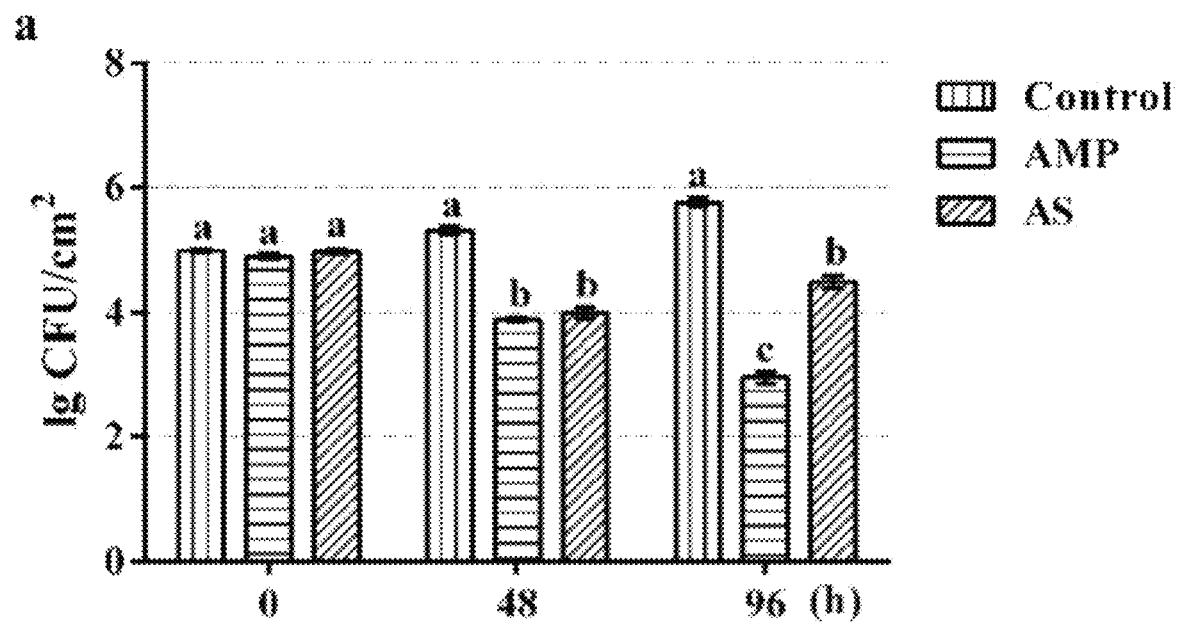

It was seen from FIG. 8A that after AMP treatment for 96 h, the PSA colonies in the control leaves increased from 4.98 to 5.76 lg CFU/cm². While the leaves treated with AMP had a bacterial load down to 2.95 lg CFU/cm², which was significantly lower than that of AS (4.48 lg CFU/cm²). After PCR amplification and DNA sequencing, it was confirmed that the bacterial load in the leaves was PSA.

Figure 8B:
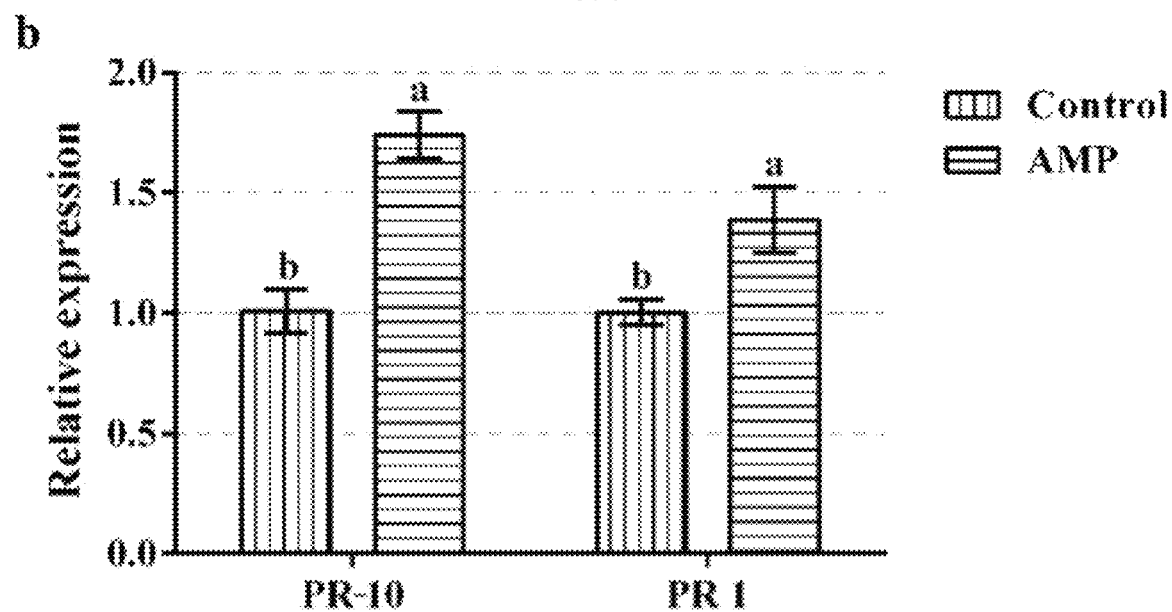

It was seen from FIG. 8B that after AMP treatment, the expression level of defense genes in PSA-inoculated kiwifruit leaves increased; at 48 h, the expression level of PR-10 was significantly increased after AMP treatment, which was 1.74 times that of the control. Compared with the control group, after AMP treatment, the expression level of PR 1 was also significantly increased, which was 1.38 times that of the control group.

It was seen from FIG. 8C that at 1 MIC, the control effect of AS on PSA was 55.80%. Compared with the control, the control effect of AMP treatment was significantly improved, reaching 70.53%, which was better than that of AS.

Example 6 Analysis of Hemolytic Activity of the AMP

The hemolytic activity of the AMP synthesized in Example 1 was evaluated by measuring a release of hemoglobin from a 4% rabbit red blood cells (rRBCs) suspension. rRBCc resuspended in PBS were mixed with different concentrations of AMPs (with a final concentration 7.81 µg/mL to 125 µg/mL) at a ratio of 1:1, incubated at 37° C. for 1 h with shaking, and centrifuged at 500×g for 10 min; an absorbance of a resulting supernatant was detected at 414 nm, while a positive control was 0.1% Triton X-100 and a negative control was PBS. The hemolytic activity of the AMP was calculated according to the following formula:

$$\text{Hemolytic activity (\%)} = \frac{OD_{peptide} - OD_{PBS}}{OD_{Triton\,X} - OD_{PBS}} \times 100\%,$$

where $OD_{peptide}$ was the absorbance of AMP treatment, $OD_{PBS}$ was the absorbance of PBS treatment, and $OD_{Triton\,X}$ was the absorbance of Triton X-100 treatment.

Figure 9:
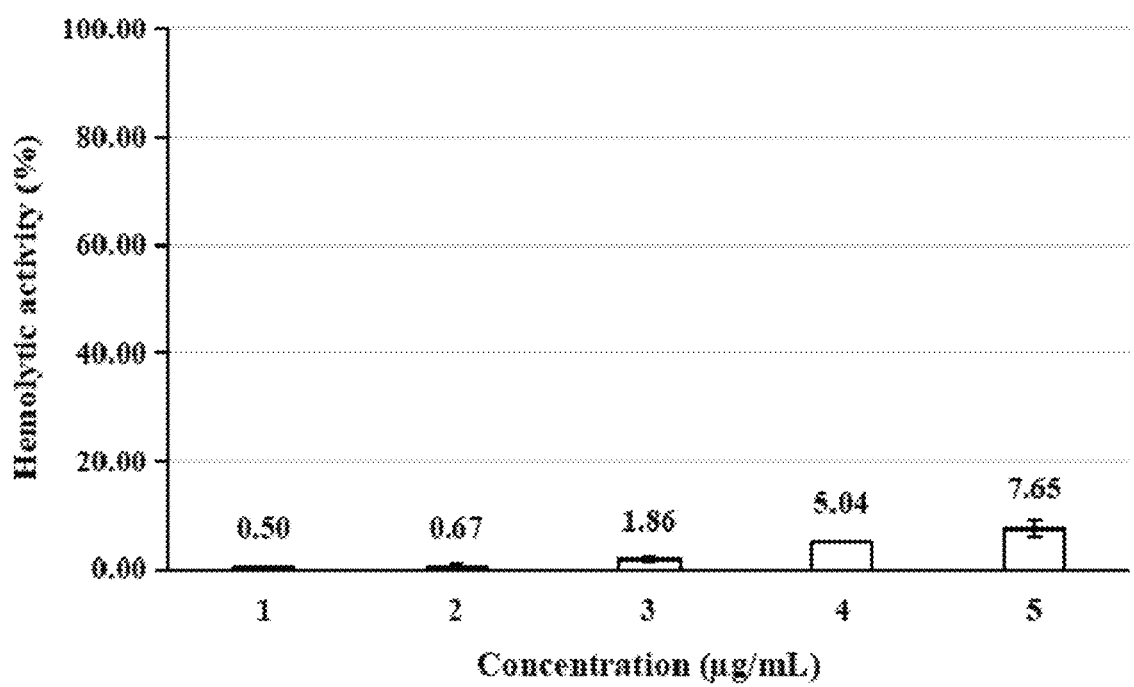
FIG. 9 shows a detection result of a hemolytic activity of the AMP.

As shown in FIG. 9, the AMP only had a lower hemolytic activity toward rRBCs. At a concentration of 7.81 µg/mL, AMP-treated rabbit red blood cells had a hemolytic activity of 0.50%; even at the highest concentration tested (125 µg/mL), the hemolytic activity was only 7.65%.

Example 7 Determination of Drug Resistance of PSA to the AMP

Microbial resistance was determined according to a method of Steczko et al. (2009, Microbial inactivation properties of a new antimicrobial/antithrombotic catheter lock solution (citrate/methylene blue/parabens)). $10^5$ CFU/mL of a PSA bacteria solution was treated with AMPs at final concentrations of 0.75 MIC, 1 MIC, and 1.25 MIC. After 24 h of incubation, the MIC was determined by microdilution assay. Subculture and MIC determination were conducted by the same method every day for a total of 14 d. The drug resistance of PSA was evaluated by observing changes of the MIC. The PSA cells were repeatedly treated with AMPs at 0.75 MIC, 1 MIC, and 1.25 MIC, and no change was found in the MIC of PSA by AMP within the time range of detection, indicating that PSA did not develop drug resistance to the AMP.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

ABSTRACT OF THE DISCLOSURE

The present disclosure provides an antimicrobial peptide (AMP) for controlling *Pseudomonas syringae* pv. *actinidiae* (PSA) and a preparation method and use thereof, belonging to the technical field of biological control. In the present disclosure, the AMP has an amino acid sequence of Trp-Trp-Lys-Leu-Leu-Arg-Lys-Leu-NH$_2$ (SEQ ID NO:1 with C-terminal amidation), and has a typical amphiphilic structure. The AMP can target a cell membrane of the PSA, increasing permeabilization and dissipating a membrane potential, which leads to calcium ion leakage. The AMP also acts on intracellular targets, affects DNA functions, reduces an activity of esterases, and induces the generation of reactive oxygen species (ROS). The AMP has a minimal inhibitory concentration (MIC) of 3.13 µg/mL and a half maximal effective concentration (EC$_{50}$) of 1.67 µg/mL for the PSA, showing an activity significantly higher than that of agricultural streptomycin.

What is claimed is:

1. An antimicrobial peptide (AMP) for controlling *Pseudomonas syringae* pv. *actinidiae* (PSA), wherein the AMP consists of the amino acid sequence of Trp-Trp-Lys-Leu-Leu-Arg-Lys-Leu-$NH_2$ (SEQ ID NO:1 with C-terminal amidation), wherein the sequence comprises eight amino acid residues.

2. A drug for controlling *Pseudomonas syringae* pv. *actinidiae* (PSA), wherein the drug contains the AMP of claim 1.

3. The drug according to claim 2, wherein the drug has a minimal inhibitory concentration (MIC) of 3.13 μg/mL and a half maximal effective concentration ($EC_{50}$) of 1.67 μg/mL for the PSA.

4. The drug according to claim 2, wherein the drug comprises components that do not affect an activity of the AMP.

5. A method for controlling *Pseudomonas syringae* pv. *actinidiae* (PSA) with an antimicrobial peptide (AMP) on kiwifruit leaves infected with *Pseudomonas syringae* pv. *actinidiae* (PSA), comprising:

applying the AMP of claim 1 to the kiwifruit leaves.

6. A method of synthesizing the AMP of claim 1, comprising:

artificially synthesizing the AMP from the C-terminus to an amino-terminus (N-terminus) by 9-fluorenylmethoxycarbonyl (Fmoc) polypeptide solid-phase synthesis.

7. The method according to claim 6, further comprising:

subjecting a Rink resin to Fmoc removal;

sequentially adding corresponding amino acids according to the sequence of the AMP;

mixing a treated Rink resin with the amino acids; and conducting amino acid coupling repeatedly until a polypeptide is synthesized.

8. The method according to claim 7, further comprising:

adding the amino acids at four times a dosage of the Rink resin.

9. A method for controlling *Pseudomonas syringae* pv. *actinidiae* (PSA) with an antimicrobial peptide on kiwifruit leaves infected with PSA, comprising:

applying the drug of claim 2 to the kiwifruit leaves.

10. The method according to claim 9, wherein the drug has a minimal inhibitory concentration (MIC) of 3.13 μg/mL and a half maximal effective concentration ($EC_{50}$) of 1.67 μg/mL for the PSA.

11. The method according to claim 9, wherein the drug comprises components that do not affect an activity of the AMP.

* * * * *